(12) United States Patent
Hatakeyama

(10) Patent No.: US 6,310,887 B1
(45) Date of Patent: Oct. 30, 2001

(54) TRANSMISSION SPEED PREDICTING APPARATUS AND TRANSMISSION SPEED PREDICTING METHOD

(75) Inventor: Izumi Hatakeyama, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/055,517

(22) Filed: Apr. 6, 1998

(30) Foreign Application Priority Data

Apr. 10, 1997 (JP) .................................................. 9-091962

(51) Int. Cl.[7] ................................ H04J 3/22; H04L 5/12
(52) U.S. Cl. ......................... 370/465; 370/320; 375/262; 714/746
(58) Field of Search .................... 370/209, 252, 370/320, 326, 335, 336, 342, 349, 465, 466, 470, 472, 473, 506, 514, 528; 375/260, 262, 265; 714/746, 751, 752, 753, 754, 756, 758, 761, 762

(56) References Cited

U.S. PATENT DOCUMENTS

| | | | |
|---|---|---|---|
| 4,630,271 | * 12/1986 | Yamada | 371/37 |
| 4,939,734 | * 7/1990 | Heichler | 371/43 |
| 5,691,955 | * 11/1997 | Yamauchi | 365/233 |
| 5,787,121 | * 7/1998 | Okamoto | 375/262 |
| 6,046,874 | * 4/2000 | Takahashi | 360/65 |

* cited by examiner

Primary Examiner—Dang Ton
Assistant Examiner—Toan Nguyen
(74) Attorney, Agent, or Firm—Jay H. Maioli

(57) ABSTRACT

First data is repeatedly sent out by using various sorts of transfer speeds by a receiver; a preselected number of polarity information about the first data is sequentially compared with each other by a first incoincident number detector to detect a first incoincident number; a most likelihood pathmetric value is detected by Viterbi-decoding each of second data a most likelihood detector; the polarity information of the respective second data is compared with the polarity information of corresponding coded data by a second incoincident number detector to detect a second incoincident number; and the transfer speed of the transmission processing is predicted by a transfer speed predicting circuit based on the first incoincident number, the most likelihood pathmetric value, and the second incoincident number, acquired every transfer period. Even when a relatively large number of errors happen to occur in the decoded data, the transfer speed can be predicted by greatly reducing the errors by using the first incoincident number acquired without being adversely influenced by the occurrence condition of the error.

8 Claims, 13 Drawing Sheets

| WIRELESS TRANS-FER SPEED | TRANSMISSION PROCESS SPEED | REPETITION NUMBER | TRANSMISSION POWER RATIO | CONVOLUTIONAL CODING RATIO | CODE ADDED DATA AMOUNT/20 msec | ORIGINAL DATA | CRC CODE | TAIL BIT |
|---|---|---|---|---|---|---|---|---|
| 19200bps (384bit/20ms) | 9600 bps | 0 TIME | 1 | 1/2 | 192 bit | 172 bit | 12 bit | 8 bit |
| | 4800 bps | 1 TIME | 1/2 | | 96 bit | 80 bit | 8 bit | |
| | 2400 bps | 3 TIMES | 1/4 | | 48 bit | 40 bit | — | |
| | 1200 bps | 7 TIMES | 1/8 | | 24 bit | 16 bit | — | |

FIG. 4

| bit3 | bit2 | bit1 | bit0 | POLARITY | RELIABILITY |
|---|---|---|---|---|---|
| 0 | 1 | 1 | 1 | 0 | High |
| 0 | 1 | 1 | 0 | 0 | \| |
| 0 | 1 | 0 | 1 | 0 | \| |
| 0 | 1 | 0 | 0 | 0 | \| |
| 0 | 0 | 1 | 1 | 0 | \| |
| 0 | 0 | 1 | 0 | 0 | \| |
| 0 | 0 | 0 | 1 | 0 | \| |
| 0 | 0 | 0 | 0 | 0 | Low |
| 1 | 1 | 1 | 1 | 1 | Low |
| 1 | 1 | 1 | 0 | 1 | \| |
| 1 | 1 | 0 | 1 | 1 | \| |
| 1 | 1 | 0 | 0 | 1 | \| |
| 1 | 0 | 1 | 1 | 1 | \| |
| 1 | 0 | 1 | 0 | 1 | \| |
| 1 | 0 | 0 | 1 | 1 | \| |
| 1 | 0 | 0 | 0 | 1 | High |

FIG. 7

| bit3 | bit2 | bit1 | bit0 | POLARITY | RELIABILITY |
|---|---|---|---|---|---|
| 0 | 1 | 1 | 1 | 0 | High |
| 0 | 1 | 1 | 0 | 0 | \| |
| 0 | 1 | 0 | 1 | 0 | \| |
| 0 | 1 | 0 | 0 | 0 | \| |
| 0 | 0 | 1 | 1 | 0 | \| |
| 0 | 0 | 1 | 0 | 0 | \| |
| 0 | 0 | 0 | 1 | 0 | \| |
| 0 | 0 | 0 | 0 | 0 | Low |
| 1 | 0 | 0 | 0 | 1 | Low |
| 1 | 0 | 0 | 1 | 1 | \| |
| 1 | 0 | 1 | 0 | 1 | \| |
| 1 | 0 | 1 | 1 | 1 | \| |
| 1 | 1 | 0 | 0 | 1 | \| |
| 1 | 1 | 0 | 1 | 1 | \| |
| 1 | 1 | 1 | 0 | 1 | \| |
| 1 | 1 | 1 | 1 | 1 | High |

FIG. 8

| bit3 | bit2 | bit1 | bit0 | POLARITY | RELIABILITY | Metric(Hex) | |
|---|---|---|---|---|---|---|---|
| | | | | | | BM0 | BM1 |
| 0 | 1 | 1 | 1 | 0 | High | 0 | F |
| 0 | 1 | 1 | 0 | 0 | | 1 | E |
| 0 | 1 | 0 | 1 | 0 | | 2 | D |
| 0 | 1 | 0 | 0 | 0 | | 3 | C |
| 0 | 0 | 1 | 1 | 0 | | 4 | B |
| 0 | 0 | 1 | 0 | 0 | | 5 | A |
| 0 | 0 | 0 | 1 | 0 | | 6 | 9 |
| 0 | 0 | 0 | 0 | 0 | Low | 7 | 8 |
| 1 | 1 | 1 | 1 | 1 | Low | 8 | 7 |
| 1 | 1 | 1 | 0 | 1 | | 9 | 6 |
| 1 | 1 | 0 | 1 | 1 | | A | 5 |
| 1 | 1 | 0 | 0 | 1 | | B | 4 |
| 1 | 0 | 1 | 1 | 1 | | C | 3 |
| 1 | 0 | 1 | 0 | 1 | | D | 2 |
| 1 | 0 | 0 | 1 | 1 | | E | 1 |
| 1 | 0 | 0 | 0 | 1 | High | F | 0 |

| LINE CONDITION | TRANSMISSION PROCESS SPEED | RECEPTION PROCESS SPEED | ERRONEOUS JUDGEMENT OF ERROR DETECTION | MOST LIKE-LIHOOD PATHMETRIC VALUE 9600bps >4800bps >2400bps >1200bps | PREDICTED ERROR NUMBER 9600bps >4800bps >2400bps >1200bps | POLARITY INCOINCIDENT NUMBER | OVERFLOW NUMBER |
|---|---|---|---|---|---|---|---|
| GOOD – NO ERROR AFTER DECODING | 9600bps | 9600bps | NO | SMALL | SMALL | --- | --- |
| | | 4800bps | YES | LARGE | LARGE | LARGE | SMALL |
| | | 2400bps | NO CRC | LARGE | LARGE | LARGE | MEDIUM |
| | | 1200bps | NO CRC | LARGE | LARGE | LARGE | LARGE |
| | 4800bps | 9600bps | YES | LARGE | LARGE | --- | --- |
| | | 4800bps | NO | SMALL | SMALL | SMALL | SMALL |
| | | 2400bps | NO CRC | LARGE | LARGE | LARGE | MEDIUM |
| | | 1200bps | NO CRC | LARGE | LARGE | LARGE | LARGE |
| | 2400bps | 9600bps | YES | LARGE | LARGE | --- | --- |
| | | 4800bps | YES | LARGE | LARGE | SMALL | SMALL |
| | | 2400bps | NO CRC | SMALL | SMALL | SMALL | SMALL |
| | | 1200bps | NO CRC | LARGE | LARGE | LARGE | MEDIUM |
| | 1200bps | 9600bps | YES | LARGE | LARGE | --- | --- |
| | | 4800bps | YES | LARGE | LARGE | SMALL | SMALL |
| | | 2400bps | NO CRC | LARGE | LARGE | SMALL | SMALL |
| | | 1200bps | NO CRC | SMALL | SMALL | SMALL | SMALL |
| BAD – ERROR AFTER DECODING | 9600bps | 9600bps | YES | MEDIUM | MEDIUM | --- | --- |
| | | 4800bps | YES | LARGE | LARGE | LARGE | SMALL |
| | | 2400bps | NO CRC | LARGE | LARGE | LARGE | MEDIUM |
| | | 1200bps | NO CRC | LARGE | LARGE | LARGE | LARGE |
| | 4800bps | 9600bps | YES | LARGE | LARGE | --- | --- |
| | | 4800bps | YES | MEDIUM | MEDIUM | SMALL | SMALL |
| | | 2400bps | NO CRC | LARGE | LARGE | LARGE | MEDIUM |
| | | 1200bps | NO CRC | LARGE | LARGE | LARGE | LARGE |
| | 2400bps | 9600bps | YES | LARGE | LARGE | --- | --- |
| | | 4800bps | YES | LARGE | LARGE | SMALL | SMALL |
| | | 2400bps | NO CRC | MEDIUM | MEDIUM | SMALL | SMALL |
| | | 1200bps | NO CRC | LARGE | LARGE | LARGE | MEDIUM |
| | 1200bps | 9600bps | YES | LARGE | LARGE | --- | --- |
| | | 4800bps | YES | LARGE | LARGE | SMALL | SMALL |
| | | 2400bps | NO CRC | LARGE | LARGE | SMALL | SMALL |
| | | 1200bps | NO CRC | MEDIUM | MEDIUM | SMALL | SMALL |

FIG. 13

TRANSMISSION SPEED PREDICTING APPARATUS AND TRANSMISSION SPEED PREDICTING METHOD

BACKGROUND OF THE INVENTION

1. Field of the Invention

The present invention is related to a transmission speed predicting apparatus and a transmission speed predicting method, and more particularly, is applicable to a communication terminal of a digital type portable telephone system, and also to a transmission speed predicting method in this communication terminal.

2. Description of the Related Art

Recently, as a wireless connection system between a base station and communication terminals, which constitute a digital type portable telephone system, there is such a wireless communication system called the code division multiple access (CDMA) system.

In the CDMA system, one transfer speed (hereinafter, referred to as "wireless transfer speed") of data used in wireless sections between a base station and communication terminals is defined as, e.g., 19,200 bps. Also, another transfer speed (hereinafter, referred to as "transmission processing speed") used in a processing executed within the base station when data is transmitted (hereinafter, referred to as "transmission processing") is defined to be 1/n ("n" being an arbitrary integer value) of the wireless transfer speed, e.g., four types of 9,600 bps, 4,800 bps, 2,400 bps, and 1,200 bps in order that this transmission processing speed is switched in response to line qualities of the base station and data qualities used therein.

On the other hand, in a communication terminal of a portable telephone system to which such a CDMA system has been applied, every time the transmission processing speed of 9,600 bps used in a transmission processing is successively lowered to such lower transfer speeds of 4,800 bps, 2,400 bps, and 1,200 bps, amounts of data produced by these lower transmission processing speeds are successively reduced. As a result, in the communication terminals, such data produced at the transmission processing speeds lower than 9,600 bps is repeatedly transmitted plural times previously set by an arbitrary number in such a manner that the data amounts produced by these lower transmission processing speeds are apparently equal to the data amount produced by the transmission processing speed of 9,600 bps. In other words, the communication terminals execute the different transmission processing from each other every time the transmission processing speed under use is changed.

As a consequence, for example, when one communication terminal receives data transmitted via the base station from another communication terminal, the communication terminal is required to process this received data (hereinafter, referred to as "reception processing") at the same transfer speed (hereinafter, referred to as "reception processing speed") as the transmission processing speed of the received data. However, normally, in the case that data is transmitted from a communication terminal, the communication terminal transmits this data without adding information about a transmission processing speed used in the communication terminal.

As a result, the communication terminal may execute the four types of reception processing using the same reception processing speeds as the above-described four types of transmission processing speeds with respect to the received data. Also, the communication terminal may predict a transmission processing speed of the received data based upon the various sorts of information acquired by these reception processing, and then may select data acquired by the reception processing using the reception processing speed substantially equal to the predicted transmission processing speed among the four types of data acquired in the four types of reception processing.

In an actual communication terminal, a cyclic redundancy check (CRC) code is added as an error detection code to a data to be transmitted in order that when the data is received, the error detection of this received data is executed, and then based on the result of this error correction, a transmission processing speed may be predicted. However, in general, the CRC code is added only to such data produced at the relatively higher transmission processing speeds, i.e., 9,600 bps and 4,800 bps. As a result, in the case that such data produced at the transmission processing speeds of 2,400 bps and 1,200 bps is received by a communication terminal, there is a problem that this communication terminal can hardly predict the transmission processing speeds of 2,400 bps and 1,200 bps.

Also, in a communication terminal, data is convolution-coded to be transmitted while a transmission processing is carried out. Every time this received data is processed by the four types of reception processing, the Viterbi-decoding operations are performed. Then, this communication terminal may predict a transmission processing speed based upon the most likelihood pathmetric values (namely, values expressed by numerically processing certainties of data series obtained by decoding) of data series acquired during the Viterbi-decoding operations. As to each of the four types of reception processing, this communication terminal compares polarity information corresponding to the data obtained before being Viterbi-decoded with polarity information corresponding to such data which is obtained by again convolution-coding the Viterbi-decoded data to thereby acquire the incoincident number of the polarity information ("1", or "0"). Thus, this communication terminal may predict this incoincident number of the polarity information as the number of errors occurred in the Viterbi-decoded data, and then may predict a transmission processing speed based on this error number (hereinafter, referred to as "predicted error number").

However, when a relatively large number of errors are produced in data decoded by the Viterbi-decoding operation in communication terminals, there are two possibilities. That is, the most likelihood pathmetric values acquired by executing the four types of reception processing are substantially equal to each other. Furthermore, the predicted error numbers acquired by executing the four types of reception processing are substantially equal to each other. In these possible cases, it is difficult to predict the transmission processing speed correctly.

SUMMARY OF THE INVENTION

In view of the foregoing, an object of this invention is to provide a transmission speed predicting apparatus and a transmission speed predicting method, both capable of improving the precision of transfer speed predicting.

The foregoing object and other objects of the invention have been achieved by the provision of a transmission speed predicting apparatus and a transmission speed predicting method, in which one transmission processing speed is selected among from a plurality of transmission processing speeds having a relation of predetermined ratio, the digital data is convolution-coded, the repeated data is produced by repeating each bit data of the digital data, which is convolution coded data, the number of times based on the ratio of the selected transmission processing speed to the maximum transmission processing speed among a plurality of transmission processing speeds, and the transmission processing speed of the transmission data is predicted from the received data which is obtained by receiving the transmission data that the digital data and the repeated data are transmitted.

The transmission speed predicting apparatus according to this invention comprises: receiving means for producing the first decision data including the polarity data of each bit of the received data from the received data; storing means for storing the first data supplied from the receiving means; first incoincident number detecting means for reading the first data from the storing means for each transmission processing speed and comparing the polarity data corresponding to each bit data of the digital data in the received data with the polarity data corresponding to the repeated data based on each bit data so as to detect the first incoincident number, and also for selecting the most likely polarity data among from the polarity data corresponding to each bit data of the digital data and the polarity data corresponding to the repeated data so as to produce the second data; most likelihood value detecting means for Viterbi-decoding the second data for each transmission processing speed so as to produce the decoded data, and also for detecting the most likelihood pathmetric value; second incoincident number detecting means for comparing the polarity data of the coded data obtained by convolution-coding the corresponding decoded data with the polarity data of the second data, so as to detect the second incoincident number; and transfer speed selecting means for selecting the transmission processing speed of the transmission data corresponding to the received data based upon the first incoincident number, the most likelihood pathmetric value, and the second incoincident number.

Also, the transmission speed predicting method, according to the preset invention, comprises the steps of: producing the first decision data including the polarity data of each bit of the received data from the received data; storing the first data supplied from the receiving means; reading the first data which has been stored for each transmission processing speed and comparing the polarity data corresponding to each bit data of the digital data in the received data with the polarity data corresponding to the repeated data based on each bit data so as to detect the first incoincident number, and selecting the most likely polarity data among from the polarity data corresponding to each bit data of the digital data and the polarity data corresponding to the repeated data so as to produce the second data; Viterbi-decoding the second data for each transmission processing speed so as to produce the decoded data, and also detecting the most likelihood pathmetric value; comparing the polarity data of the coded data obtained by convolution-coding the corresponding decoded data with the polarity data of the second data, so as to detect the second incoincident number; and selecting the transmission processing speed of the transmission data corresponding to the received data based upon the first incoincident number, the most likelihood pathmetric value, and the second incoincident number.

As a result, even when a relatively large number of errors happen to occur in the decoded data, so that the respective most likelihood pathmetric values acquired every transfer speed are made substantially equal to each other, or the second incoincident numbers acquired every transfer speed become substantially same values, the transfer speed of the transmission processing for data received by using the first incoincident number which is detectable without being adversely influenced by the occurrence condition of the error in the decoded data can be predicted by greatly reducing the errors.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 4 is a table for explaining transmission processing in the channel codec;

FIG. 7 is a table for explaining the first soft-decision data entered into the data adding processor;

FIG. 8 is a table for explaining the first soft-decision data whose polarity is decided;

FIG. 13 is a table for explaining the prediction of a transmission processing speed.

DETAILED DESCRIPTION OF THE EMBODIMENT

Figure 1:
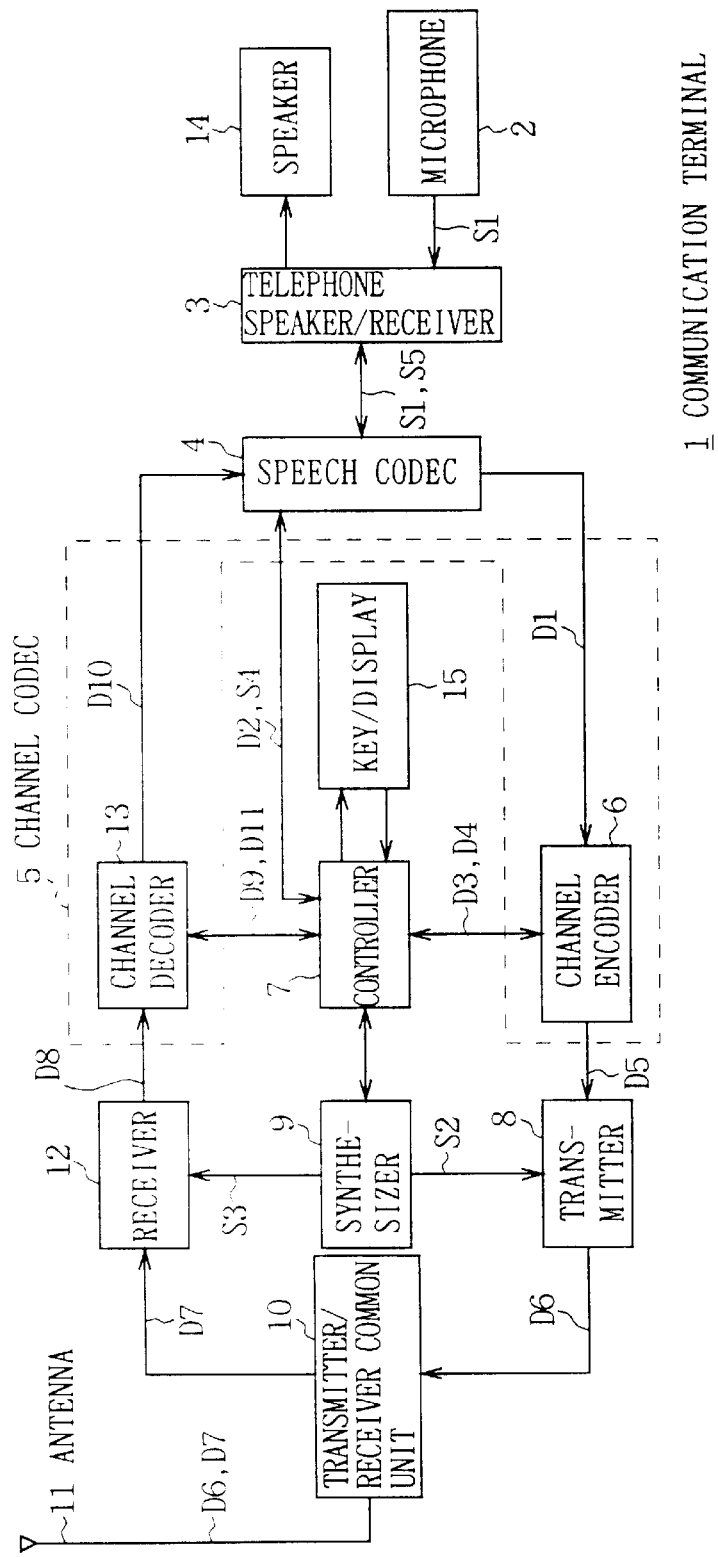
FIG. 1 is a block diagram for representing the circuit arrangement of a communication terminal according to an embodiment of the present invention.

Preferred embodiments of this invention will be described with reference to the accompanying drawings:

In FIG. 1, reference numeral 1 shows an overall arrangement of a communication terminal to which the present invention has been applied. While a telephone conversation is established, speech (voice) of a user collected by a microphone 2 is converted into a speech signal S1 which is sent to a telephone speaker/receiver 3. This speech signal S1 is interface-converted by the telephone speaker/receiver 3 and then the interface-converted speech signal S1 is supplied to a speech codec 4.

The speech codec 4 detects a line quality and a quality of the speech signal S1, and based upon the detection results, sequentially selects one of four sorts of the transmission speeds of the speech signal S1, 9,600 bps, 4,800 bps, 2,400 bps, and 1,200 bps to switch them. Every time the transmission processing speed is selected to be switched, the speech codec 4 digitalizes the speech signal S1 produced at the transmission processing speed selected at this time to thereby generate speech data D1, and then sends out this speech data D1 to a channel encoder 6 of a channel codec 5. In addition, the speech codec 4 produces speed information data D2 indicative of the selected transmission processing speed every time the transmission processing speed is selected to be switched, and then sends out this speed information data D2 to a controller 7.

The controller 7 produces control data D3 in response to the transmission processing speed indicated by the speed information data D2, and then sends out this control data D3 to the channel encoder 6.

The channel encoder 6 is designed to execute a transmission processing based on the control data D3 in response to the used transmission processing speed. The channel encoder 6 sends out conversion data D5 to a transmitter 8, and this conversion data D5 is produced by adding communication control data D4 inputted from the controller 7 to the speech data D1, and by convolution-coding the added communication control data D4, and thereafter by converting the convolution-coded communication control data into a predetermined data format.

A frequency control signal S2 for controlling a transmission frequency is inputted from a synthesizer 9 to the transmitter 8. Based upon this frequency control signal S2, the transmitter 8 modulates the conversion data D5 by a predetermined format to produce transmission data D6. Then, the transmitter 8 transmits this transmission data D6 via a transmitter/receiver common unit 10 and an antenna 11 to a base station (not shown) in a burst manner (for instance, one time period being equal to 20 msec) at a wireless transfer speed of 19,200 bps.

At this time, the base station (not shown) transmits such data similar to the above-described transmission data D6 in the wireless transfer speed of 19,200 bps in the burst manner (for example, one time period being equal to 20 msec). This data is processed by the transmission processing by using a transmission processing speed of 9,600 bps, 4,800 bps, 2,400 bps, or 1,200 bps. As a result, a receiver 12 of the communication terminal 1 receives the data (hereinafter, referred to as "reception data") transmitted from this base station via the antenna 11 and thereafter a transmitter/receiver common unit 10.

A frequency control signal S3 for controlling a reception frequency is inputted from the synthesizer 9 to the receiver 12. Based upon this frequency control signal S3, the receiver 12 demodulates the reception data D7 by a predetermined format to produce demodulation data D8. Then, the receiver 12 sends out this demodulation data D8 to a channel decoder 13.

The overall channel decoder 13 is controlled based upon control data D9 entered from the controller 7, and executes a reception processing while the demodulation data D8 is transferred at four sorts of reception processing speeds of 9,600 bps, 4,800 bps, 2,400 bps, and 1,200 bps similar to the transmission processing speed. In this case, the channel decoder 13 converts the demodulation data D8 into respective predetermined formats corresponding to the above-described four sorts of reception processing speeds. Also, this channel decoder 13 error-corrects the demodulation data D8 by way of the Viterbi-decoding method to decode this demodulation data D8, so that four sorts of decoded data are finally produced.

In addition, the channel decoder 13 predicts the transmission processing speed used in this demodulation data D8 from the various sorts of information obtained from the four sorts of reception processing of the demodulation data D8, and selects such decoded data acquired from the reception processing in which the same reception processing speed as this predicted transmission processing speed among the four sorts of decoded data is used. Also, this channel decoder 13 sends out speech data D10 to the speech codec 4 and also communication control data D11 to the controller 7 among the communication control data D11 and the speech data D10 corresponding to speech of a counter party in a telephone conversation, which constitute this selected decoded data.

In response to a control signal S4 entered from the controller 7, the speech codec 4 converts the speech data D10 into an analog speech signal S5, and further interface-converts this speech signal S5 via the telephone transmitter/receiver 3, and thereafter sends out this interface-converted analog speech signal S5 to a speaker 14. As a result, the speech (voice) of the counter party of the telephone conversation is generated from the speaker 14, and therefore a telephone speech conversation may be realized between the user and this counter party in the communication terminal 1.

It should be understood that the controller 7 produces the communication control data D4 added to the speech data D1, decodes the communication control data D11 entered from the channel decoder 13 to thereby set/reset/maintain the call, and further executes I/O-control of a key/display 15. In addition, the controller 7 controls the synthesizer 9 for controlling both the transmission frequency and the reception frequency.

Figure 2:
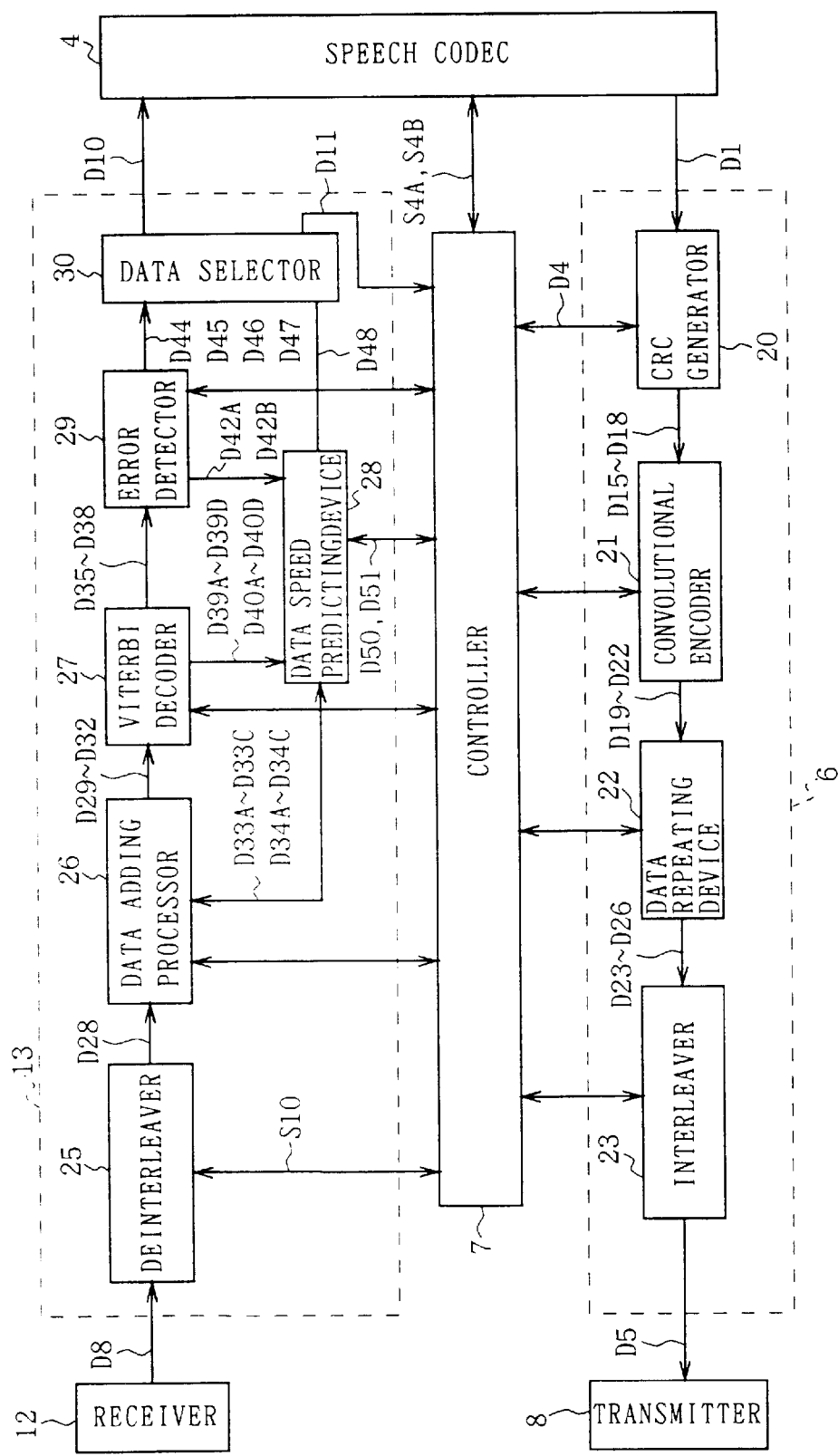
FIG. 2 is a block diagram for showing the circuit arrangement of a channel codec circuit.
Figure 3:
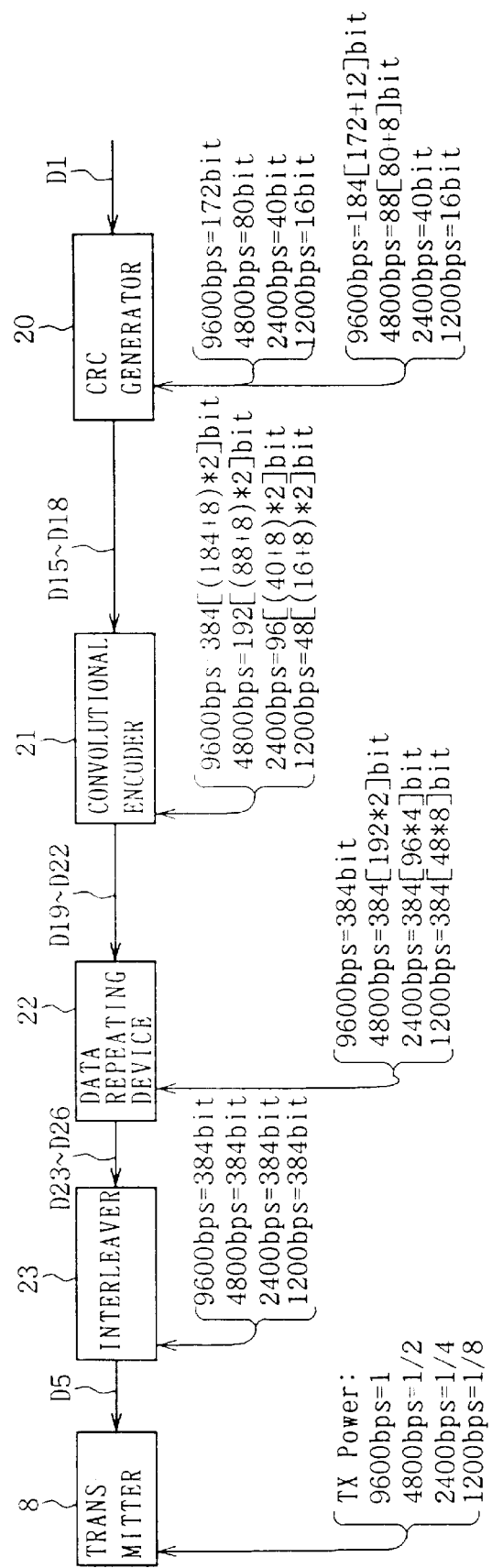
FIG. 3 is a block diagram for explaining transmission processing in the channel codec.

As indicated in FIG. 2 and FIG. 3 in which the same reference numerals shown in FIG. 1 are employed as those for denoting the same or similar circuit components, when the data is transmitted, the speech data D1 produced in the transmission processing speed of 9,600 bps, 4,800 bps, 2,400 bps, or 1,200 bps is first entered from the speech codec 4 to the CRC generator 20.

In the case that such speech data D1 produced in the transmission processing speed of 9,600 bps is first inputted into the CRC generator 20, this CRC generator 20 adds the communication control data D4 entered from the controller 7 to this speech data D1 so as to generate 172 bit (in total) original data, and further generates a 12-bit CRC code from this 172-bit original data by employing a generating polynomial G1 (X) expressed by the following equation (1):

$$G1\ (X) = X^{12} + X^{11} + X^{10} + X^9 + X^8 + X^4 + X + 1 \tag{1}$$

Thereafter, the CRC generator 20 adds this 12-bit CRC code to the original data so as to produce 184-bit data. Subsequently, the CRC generator 20 adds an 8-bit tail bit made of 0 to this 184-bit data in order to produce 192-bit code addition data D15 which will then be supplied to a convolution encoder 21.

In the case that such speech data D1 produced in the transmission processing speed of 4,800 bps is then inputted into the CRC generator 20, this CRC generator 20 adds the communication control data D4 entered from the controller 7 to this speech data D1 so as to generate 80-bit (in total) original data, and further generates an 8-bit CRC code from this 80-bit original data by employing a generating polynomial G2 (X) expressed by the following equation (2):

$$G2(X) = X^8 + X^7 + X^4 + X^3 + X + 1 \tag{2}$$

Thereafter, the CRC generator 20 adds this 8-bit CRC code to the original data so as to produce 88-bit data.

Subsequently, the CRC generator 20 adds an 8-bit tail bit made of 0 to this 88-bit data in order to produce 96-bit code addition data D16 which will then be supplied to the convolution encoder 21.

Furthermore, in the case that such speech data D1 produced in the transmission processing speed of 2,400 bps is then inputted into the CRC generator 20, this CRC generator 20 adds the communication control data D4 entered from the controller 7 to this speech data D1 so as to generate 40-bit original data, and adds an 8-bit tail bit made of 0 to this 40-bit data in order to produce 48-bit code addition data D17 which will then be supplied to the convolution encoder 21. Moreover, in the case that such speech data D1 produced in the transmission processing speed of 1,200 bps is then inputted into the CRC generator 20, this CRC generator 20 adds the communication control data D4 entered from the controller 7 to this speech data D1 so as to generate 16-bit original data, and adds a tail bit having an 8-bit data amount to this 16-bit data in order to produce 24-bit code addition data D18 which will then be supplied to the convolution encoder 21.

The convolution encoder 21 convolution-encodes the code addition data D15 to D18 based upon a preset constraint length "k" (in this embodiment, this constraint length is set to 9) and a coding ratio "R" (in this embodiment, this coding ratio is set to ½), and thereafter sends out the convolution-coded data D19 to D22 to a data repeating device 22. For instance, the convolution encoder 21 produces 384-bit coded data D19 from the 192-bit code addition data D15 produced in the transmission processing speed of 9,600 bps, and also produces 192-bit coded data D20 from the 96-bit code addition data D16 produced in the transmission processing speed of 4,800 bps. Also, the convolution encoder 21 produces 96-bit coded data D21 from the 48-bit code addition data D17 produced in the transmission processing speed of 2,400 bps, and also produces 48-bit coded data D22 from the 24-bit code addition data D18 produced in the transmission processing speed of 1,200 bps.

In the data repeating device 22, a repetition number of data is preset with respect to each of these transmission processing speeds. First, the 384-bit coded data D19 produced in the transmission processing speed of 9,600 bps is not repeated, but is directly supplied as repetition data D23 to an interleaver 23. As to the 192-bit code addition data D20 produced in the transmission processing speed of 4,800 bps, the data repeating device 22 repeatedly, sequentially uses 1-bit data (namely, two sets of same data are continued) to produce 384-bit repetition data D24, and then sends out this repetition data D24 to the interleaver 23.

Also, as to the 96-bit code addition data D21 produced in the transmission processing speed of 2,400 bps, the data repeating device 22 repeatedly, sequentially uses 1-bit data three times (namely, four sets of same data are continued) to produce 384-bit repetition data D25, and then sends out this repetition data D25 to the interleaver 23. As to the 48-bit code addition data D22 produced in the transmission processing speed of 1,200 bps, the data repeating device 22 repeatedly, sequentially uses 1-bit data seven times (namely, eight sets of same data are continued) to produce 384-bit repetition data D25, and then sends out this repetition data D25 to the interleaver 23.

As previously explained the data repeating device 22 repeats the coded data D20 to D22 produced in the transmission processing speeds of 4,800 bps, 2,400 bps, and 1,200 bps in such a manner, so that the repetition data D24 to D26 having the apparently same bit lengths as the bit length of the 384-bit repetition data D23 produced from the transmission processing speed of 9,600 bps are produced.

The interleaver 23 interleaves the repetition data D23 to D26 in accordance with a preset data format irrespective of the transmission processing speed, and then supplies the resultant 384-bit conversion data D5 to the transmitter 8.

As shown in FIG. 4, the transmitter 8 sequentially modulates the conversion data D5 every 384 bits, and then transmits the modulated 384-bit transmission data D6 as a data amount of one time period (20 msec) in the wireless transfer speed of 19,200 bps in a burst manner. It should also be noted that the transmitter 8 is designed to switch the transmission power of the transmission data D6 every transmission processing speed. Assuming now that the transmission power when the transmission processing speed is selected to be 9,600 bps is 1, when the transmission processing speed is selected to be 4,800 bps, the transmission power is ½; when the transmission processing speed is selected to be 2,400 bps, the transmission power is ¼; and further when the transmission processing speed is selected to be 1,200 bps, the transmission power is ⅛.

Figure 5:
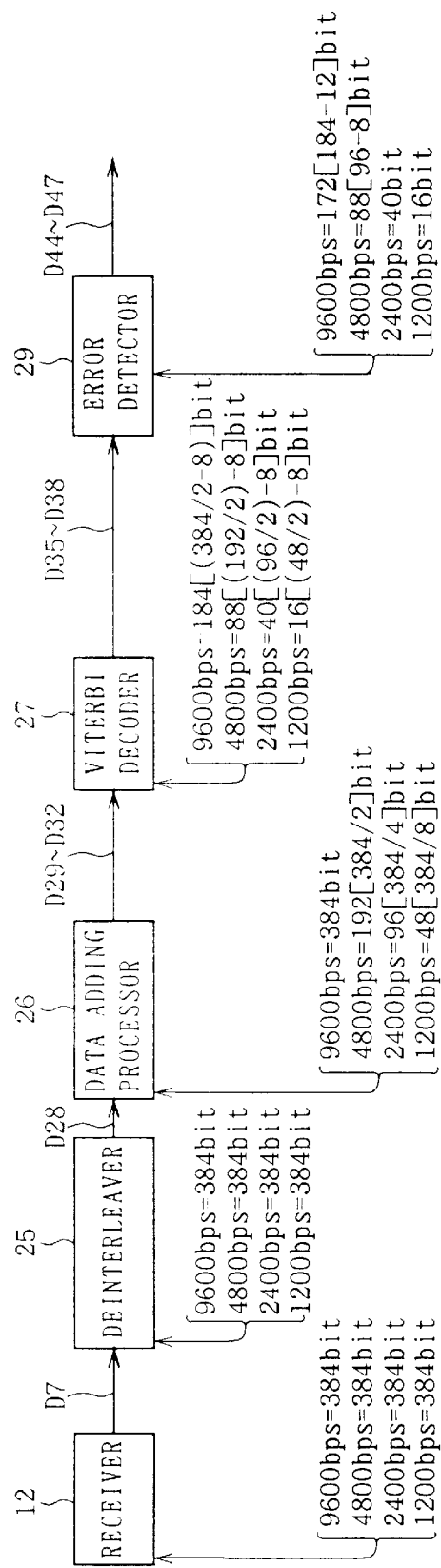
FIG. 5 is a block diagram for explaining reception processing in the channel codec.

On the other hand, in FIG. 2 and FIG. 5 in which the same reference numerals shown in FIG. 1 will be employed as these for denoting the same or similar components, in the channel decoder 13, the demodulation data D8 outputted from the receiver 12 is entered into a deinterleaver 25. In the case that the 1-bit data of the reception data D7 is sequentially demodulated in the receiver 12, this reception data D7 is demodulated to obtain polarity information (1 or 0), and reliability information indicative of numerically expressing reliability of this polarity information, so that for example, 16-value soft-decision data is acquired from the reception data D7.

A memory unit (not shown) is provided within the deinterleaver 25. The demodulation data D8 constructed of the 16-value soft-decision data is sequentially stored in unit of a 384-bit length (namely, data amount of 1 time period during data transmission) into this memory unit. Also, the demodulation data D8 is read out every 384-bit length from this memory unit by using the four sorts of reception processing speeds, i.e., 9,600 bps, 4,800 bps, 2,400 bps, and 1,200 bps (in other words, one set of demodulation data D8 having 384-bit length is read out four times while changing reception processing speeds). In addition, the deinterleaver 25 deinterleaves each of the demodulation data D8 having the 384-bit lengths which are read out from the memory unit by using the four sorts of reception processing speeds, respectively, in accordance with a predetermined data format. As a result, the 16-value soft-decision data D28 with the 384-bit length (hereinafter, referred to as "first soft-decision data") is supplied from the deinterleaver 25 to a data adding processor 26.

The data adding processor 26 produces 16-value soft-decision data D29 to D32 having preselected bit numbers (hereinafter, referred to as "second soft-decision data") from the first soft-decision data D28 (384 bits) before 1-bit data is repeated predetermined times every time the reception processing speed under use is changed. First, the first soft-decision data D28 entered in the reception processing speed of 9,600 bps is directly sent out as the second soft-decision data D29 to a Viterbi decoder 27 without executing any data process.

In addition, the data adding processor 26 produces the second soft-decision data D30 of a 192-bit length from the first soft-decision data D28 entered thereinto in the reception processing speed of 4,800 bps, and then sends out this second soft-decision data D30 to the Viterbi decoder 27. At this time, the data adding processor 26 produces such polarity comparison data D33A and then supplies this polarity comparison data D33A to a data speed predicting device 28. This polarity comparison data D33A represents a result of comparing the polarity information while sequentially using 2-bit data contained in the first soft-decision data D28 from top data thereof. Also, the data adding processor 26 produces overflow data D34 indicative of a result of adding the reliability information to each other, and then supplies this overflow data D34 to the data speed predicting device 28.

Also, the data adding processor 26 produces the second soft-decision data D31 of a 96-bit length from the first soft-decision data D28 entered thereinto in the reception processing speed of 2,400 bps, and then sends out this second soft-decision data D31 to the Viterbi decoder 27. At this time, the data adding processor 26 produces such polarity comparison data D33B and overflow data D34B, and then supplies the polarity comparison data D33A and the overflow data D34B to the data speed predicting device 28 in a similar manner to the above case, while sequentially using 4-bit data of the first soft-decision data D28 from top data thereof.

Furthermore, the data adding processor 26 produces the second soft-decision data D32 of a 48-bit length from the first soft-decision data D28 entered thereinto in the reception processing speed of 1,200 bps, and then sends out this second soft-decision data D32 to the Viterbi decoder 27. At this time, the data adding processor 26 produces such polarity comparison data D33C and overflow data D34C, and then supplies the polarity comparison data D33C and the overflow data D34C to the data speed predicting device 28, while sequentially using 8-bit data of the first soft-decision data D28 from the top data thereof.

The Viterbi decoder 27 executes the most likelihood decoding operation such that the constraint length "k" is set to 9 and the coding ratio "R" is set to ½ with employment of Viterbi algorithms with respect to the second soft-decision data D29 to D32 inputted in the four sets of reception processing speeds to thereby produce decoded data D35 to D38 (except for tail bit) from the second soft-decision data D29 to D32. Then, the Viterbi decoder 27 sends out the produced decoded data D35 to D38 to the error detector 29. In addition, the Viterbi decoder 27 sets most likelihood pathmetric values acquired when the data are decoded as most likelihood pathmetric data D39A to D39D, and also sets predicted error numbers as predicted error number data D40A to D40D, and then sends out these most likelihood pathmetric data and predicted error number data to the data speed predicting device 28.

It should be noted that the Viterbi decoder 27 produces 184-bit decoded data D35 from the second soft-decision data D29 of 384 bit which is inputted thereinto in the reception processing speed of 9,600 bps, and also produces 88-bit decoded data D36 from the second soft-decision data of 192 bits which is inputted thereinto in the reception processing speed of 4,800 bps. Furthermore, the Viterbi decoder 27 produces 40-bit decoded data D37 from the second soft-decision data D31 of 96 bits which is inputted thereinto in the reception processing speed of 2,400 bps, and also produces 16-bit decoded data D38 from the second soft-decision data of 48 bits which is inputted thereinto in the reception processing speed of 1,200 bps.

The error detector 29 error-detects the decoded data D35 entered thereinto in the reception processing speed of 9,600 bps by using the generating polynomial G1 (X) expressed in the above-described equation (1), and then sends out the error detection result as error detection data D42A to a data speed predicting device 28. Also, this error detector 29 removes from the decoded data D35, such a data portion estimable in that the CRC code has been added, and thus sends out the 172-bit original data D44 to a data selector 30.

The error detector 29 error-detects the decoded data D36 entered thereinto in the reception processing speed of 4,800 bps by using the generating polynomial G2 (X) expressed in the above-described equation (2), and then sends out the error detection result as error detection data D42B to the data speed predicting device 28. Also, this error detector 29 removes from the decoded data D36, such a data portion estimable in that the CRC code has been added, and thus sends out the 80-bit original data D45 to a data selector 30 in a similar manner to the above-described decoded data D35.

Furthermore, the error detector 29 directly sends out the decoded data D37 inputted thereinto in the reception processing speed of 2,400 bps as original data D46 to the data selector 30 without executing the data process operation, and also directly sends out the decoded data D38 inputted thereinto in the reception processing speed of 1,200 bps as original data D47 to the data selector 30 without executing the data process operation. As described above, in the channel decoder 13, the 384-bit demodulated data is reception processed by using such of the four sorts of reception processing speeds, so that the four sorts of original data D44 to D47.

In this case, the data speed predicting device 28 may predict the transmission processing speed of the transmission processing for the reception data D7 corresponding to the 384-bit demodulated data D8 before being demodulated based upon the polarity comparison data D33A to D33C, the overflow data D34A to D34C, the most likelihood pathmetric data D39A to D39D, the predicted error number data D40A to D40D, and also the error detection data D42A to D42B, which are acquired when this 384-bit demodulated data D8 is reception processed in the four sorts of reception processing speeds. Also, the data speed predicting device 28 sends out this prediction result as predicted speed data D48 to the data selector 30.

As a result, based on the predicted speed data D48, the data selector 30 selects one of such original data D44, D45, D46 or D47 which are acquired by executing the reception processing for one set (four sorts) of original data D44 to D47 corresponding thereto while using the reception processing speed identical to the predicted transmission processing speed. The data selector 30 subdivides the selected original data D44, D45, D46 or D47 into speech data D10 and communication control data D1. Also, the data selector 30 supplies the speech data D10 to the speech codec 4, and further supplies the communication control data D11 to the controller 7. In this manner, the original data can be sequentially produced from each of the 384-bit demodulated data D8 in the channel decoder 13, and the original data is reception processed by using the same reception processing speed as the transmission processing speed under use.

In addition, when the transmission processing speed is predicted, the data speed predicting device 28 judges as to whether or not an error happens to occur in the decoded data D35, D36, D37, or D38 which are acquired in the reception processing in which the same reception processing speed as this predicted transmission processing speed is used. When the data speed predicting device 28 judges that the relevant decoded data D35, D36, D37, or D38 is correct (namely, no error happens to occur), this data speed predicting device 28 sends out processing success data D50 to the controller 7, whereas when the data speed predicting device 28 judges that a relatively large number of errors happen to occur, this data speed predicting device 28 supplies processing fail data D51 to the controller 7.

As a consequence, when the processing success data D50 is entered, this controller 7 sends out a control signal S4A to the speech codec 4 in order to control this speech codec 4 to directly execute the reception processing. Conversely, when the processing fail data D51 is entered, the controller 7 supplies, for instance, such a control signal S4B to the speech codec 4 so as to control this speech codec 4 to stop the reception processing, and further furnishes a resent request signal S10 to the deinterleaver 25 in order that the first soft-decision data D28 whose processing operation fails is resent from this deinterleaver 25.

Figure 6:
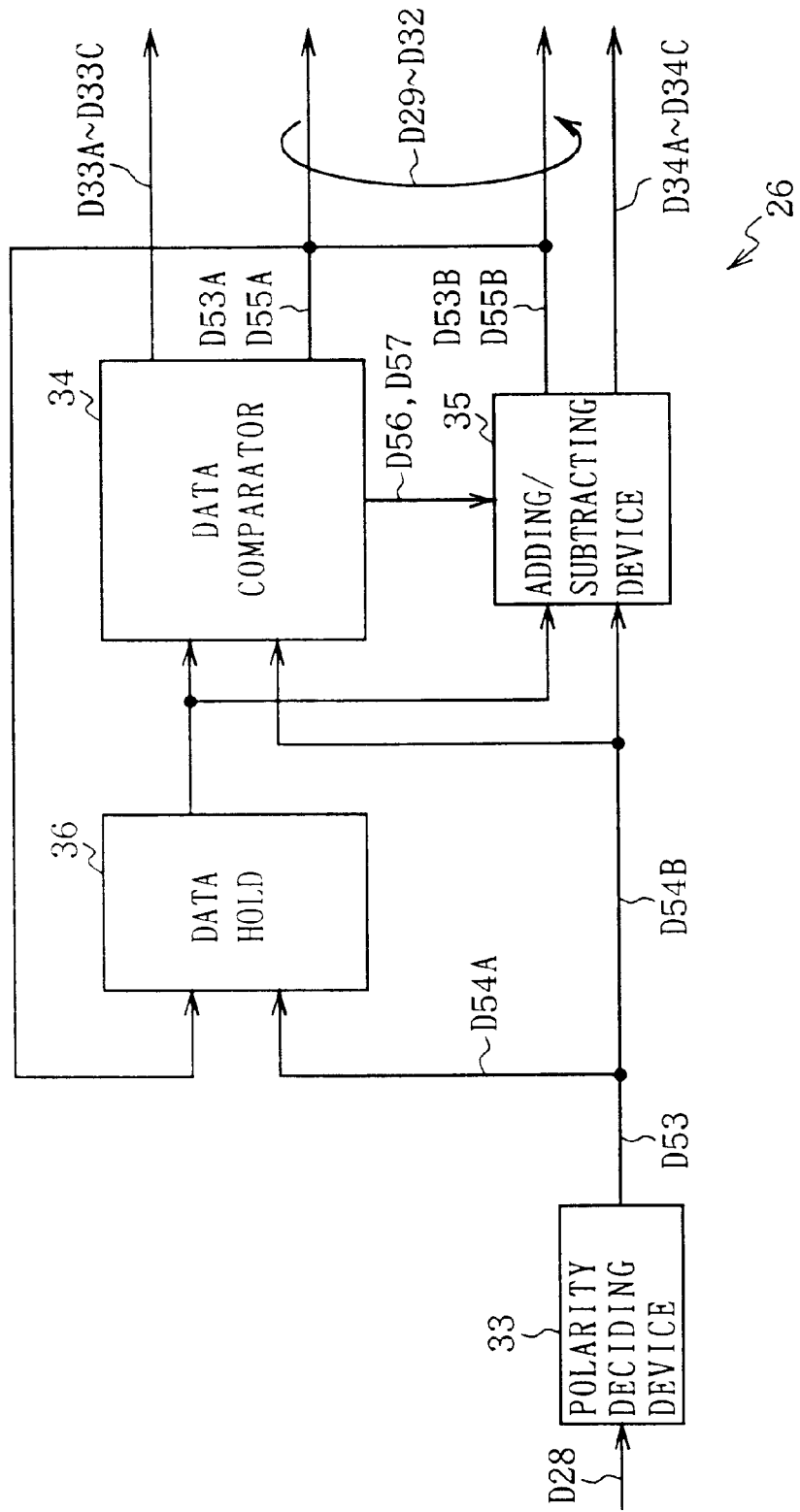
FIG. 6 is a block diagram for showing the circuit arrangement of a data adding processor.

In this case, as shown in FIG. 6, FIG. 7 and FIG. 8, in the data adding processor 26, the first soft-decision data D28 is actually inputted into a polarity deciding device 33.

In this case, the first soft-decision data D28 is constructed of reliability information in which 384-bit data is expressed by three pieces of data (bit0 to bit2) respectively, and polarity information in which 384-bit data is expressed by one piece of data (bit3). For instance, as to the reliability information, when a line quality of a wireless section and the like is relatively high, there is a relatively low possibility that an error happens to occur in data, so that the reliability information indicates a high state of reliability. Conversely, when this line quality is relatively low, there is a relatively high possibility that an error happens to occur in data, so that the reliability information indicates a low state of reliability. It should be understood that the first soft-decision data D28 shown in the drawing indicates such a condition that, for example, reliability is successively lowered from the top data, and then is again increased (see FIG. 7).

First, when the first soft-decision data D28 is inputted into the polarity deciding device 33 in the reception processing speed of 9,600 bps, this polarity deciding device 33 sequentially sends out each of 1-bit data of this first soft-decision data D28 as information data D53 to a data comparator 34 and an adding/subtracting device 35. The data comparator 34 supplies the polarity information of the information data D53 as polarity information data D53A to the Viterbi decoder 27, and the adding/subtracting device 35 supplies the reliability information of the information data D53 as reliability information data D53B to the Viterbi decoder 27. The data adding processor 26 directly sends out the first soft-decision data D28 as the second soft-decision data D29 to the Viterbi decoder 27.

Also, when the first soft-decision data D28 is inputted in each of the reception processing speeds of 4,800 bps, 2,400 bps, and 1,200 bps into the polarity deciding device 33, this polarity deciding device 33 sequentially decides the polarity information (namely, "1" or "0") with respect to each of the information data of this first soft-decision data D28. Only when the judged polarity information is equal to 1, this polarity deciding device 33 inverts the reliability information of this information data (namely, "0" from "1", or "1" from "0"), and then sequentially outputs the respective information data from the top data thereof.

In an actual case, when the first soft-decision data D28 is inputted in the reception processing speed of 4,800 bps, into the polarity deciding device 33, this polarity deciding device 33 decides the polarity information, and thereafter sends out odd-numbered information data from the top data of the first soft-decision data D28 as original information data to be repeated D54A (hereinafter, referred to as "original information data") to a data hold 36, and also sends out even-numbered information data from this top data as repeated original information data D54B (hereinafter, referred to as "repeated information data") to a data comparator 34 and the adding/subtracting device 35.

Also, when the first soft-decision data D28 is entered into the polarity deciding device 33 in the reception processing speed of 2,400 bps, this polarity deciding device 33 decides the polarity information, and thereafter sends out an na-th information data from the top data of the first soft-decision data as the original information data D54A to the data hold 36. This na-th information data is expressed by the following equation (3):

$$na = 4ma + 1 \, (\text{``}ma\text{''} = 0, 1, 2, 3, \ldots 95) \quad (3)$$

This polarity deciding device 33 sends out 3 pieces of information data serially continued to this original information data D54A as the repeated information data D54B to the data comparator 34 and the adding/subtracting device 35. Furthermore, when the first soft-decision data D28 is entered into the polarity deciding device 33 in the reception processing speed of 1,200 bps, this polarity deciding device 33 decides the polarity information, and thereafter sends out an nb-th information data from the top data of the first soft-decision data as the original information data D54A to the data hold 36. This nb-th information data is expressed by the following equation (4):

$$nb = 8mb + 1 \, (\text{``}mb\text{''} = 0, 1, 2, 3, \ldots 47) \quad (4)$$

This polarity deciding device 33 sends out 7 pieces of information data serially continued to this original information data D54A as the repeated information data D54B to the data comparator 34 and the adding/subtracting device 35.

The data hold 36 once holds the original information data D54A, and sends out this original information data D54A to a data comparator 34 and the adding/subtracting device 35, respectively, when the first repeated information data D54B immediately after this original information data D54A is entered into the data comparator 34 and the adding/subtracting device 35.

The data comparator 34 compares both the polarity information and the reliability information (which reliability of data is higher) of the original information data D54A with those of the repeated information data D54B. When the polarity information of the original information data D54A is made coincident with that of the repeated information data D54B, this data comparator 34 outputs only to polarity information of the original information data D54A as new polarity information data D55A the acquire one polarity information from two polarity information), and further sends out addition control data D56 to the adding/subtracting device 35 so as to add the reliability information of the original information data D54A to the reliability information of the repeated information data D54B.

In addition, when the polarity information compared with each other is made incoincident, the data comparator 34 outputs as new polarity information data D55A, the polarity information of either the original information data D54A or the repeated information data D54B, whose reliability is higher, as a result of the reliability information comparison, among the polarity information of the original information data D54A and the polarity information of the repeated information data D54B. Also, the data comparator 34 sends out subtraction control data D57 to the adding/subtracting device 35 as to the reliability information of the original information data D54A and the reliability information of the repeated information data D54B. This subtraction control data D57 subtracts the reliability information indicative of the low reliability from that of the high reliability.

The adding/subtracting device 35 is controlled in response to either the addition control data D56 or the subtraction control data D57, which is entered from the data comparator 34 so as to execute either the addition processing or the subtraction processing for the reliability information of the original information data D54A and of the repeated information data D54B. As a result, one piece of reliability information is newly acquired from two pieces of reliability information, and thus this one piece of new reliability information is outputted as new reliability information data D55B from this adding/subtracting device 35.

In the case that the reception processing speed of 4,800 bps is used, the data adding processor 26 repeatedly performs the above-described data processing operations by the data comparator 34 and the adding/subtracting device 35 to sequentially select one piece of polarity information having a first certainty indicated by 2-bit data every this 2-bit data. Then, the data adding/subtracting device 26 sends out to the Viterbi decoder 27, both new polarity information data D55A and new reliability information data D55B, which represent this selected polarity information and new reliability information thereof. As a result, the data adding processor 26 is capable of producing the second soft-decision data D30 of 192 bits in which each of 1-bit information data is constituted by the new polarity information data D55A and the new reliability information data D55B corresponding thereto from the first soft-decision data D28 of 384 bits.

Every time the data processing operation for the first soft-decision data D28 of 384 bits is accomplished, the data comparator 34 produces polarity comparison data D33A and sends out this polarity comparison data D33A to the data speed predicting device 28. This polarity comparison data D33A represents a total incoincident number of the polarity information compared during this data processing operation (hereinafter, referred to as a "polarity incoincident number"). When an addition value overflows which is obtained by adding the reliability information during the data processing operation with respect to the first soft-decision data D28 of 384 bits, the adding/subtracting device 35 limits this overflowed addition value and then fixes this limited addition value to a preset maximum value. Also, every time the data processing operation for the first soft-decision data D28 of 384 bits is ended, the data comparator 34 sends out to the data speed predicting device 28, overflow data D34A indicative of a total number of the overflowed addition values during this data processing operation.

In the case that the reception processing speeds of 2,400 bps and 1,200 bps are used respectively, the data adding processor 26 sends out both the new polarity information data D55A and the new reliability information data D55B to the data hold 36 so as to be once held in this data hold 36, which are produced and outputted by data-processing the original information data D54A and the first repeated information data D54B derived from the data comparator 34 and the adding/subtracting device 35. In such a case that the second repeated information data D54B subsequent to this original information data D54A is entered from the polarity deciding device 33 to the data comparator 34 and the adding/subtracting device 35, the data hold 36 supplies both the new polarity information data D55A and the new reliability information data D55B, which are held therein, to this data comparator 34, and further sends out this new reliability information data D55B to the adding/subtracting device 35.

As a consequence, similar to the above-described data processing operation for the original information data D54A and the first repeated information data D54B, the data comparator 34 again produces one piece of new polarity information data D55A from the new polarity information data D55A, the new reliability information data D55B, and also the second repeated information data D54B, and then sends out this one piece of the produced new polarity information data D55A to the data hold 36. Also, similar to the above-described data processing operation for the original information data D54A and the first repeated information data D54B, the adding/subtracting device 35 again produces one piece of new reliability information data D55B from the new reliability information data D55B, and also the second repeated information data D54B, and then sends out this one piece of the produced new reliability information data D55B to the data hold 36. Thus, the data hold 36 holds both the new polarity information data D55A and the new reliability information data D55B until the third repeated information data D54B subsequent to the original information data D54A to the data comparator 34 and the adding/subtracting device 35.

As previously explained, in the data adding processor 26, until the repeated information data D54B located at the last data position among the respective repeated information data D54B serially continued to the original information data D54A is inputted into the data comparator 34 and the adding/subtracting device 35, this data comparator 34 again produces the new polarity information data D55A from the repeated information data D54B, and both the new polarity information data D55A and the new reliability information data D55B produced in one preceding data processing operation. Also, the adding/subtracting device 35 again produces the new reliability information data D55B from the repeated information data D54B and also the new reliability information data D55B produced in one preceding data processing operation.

In addition, in the data adding processor 26, when the repeated information data D54B positioned at the last data position among each of the serially continued repeated information data D54B is inputted to the data comparator 34 and the adding/subtracting device 35, and therefore both the new polarity information data D55A and the new reliability information data D55B are produced, these data are sent to the Viterbi decoder 27.

As described above, when the reception processing speed of 2,400 bps is used, the data adding processor 26 sequentially selects one piece of polarity information having the first certainty every four pieces (in total) of information data arranged by one piece of original information data D54A and three pieces of repeated information data D54B subsequent to this original information data D54A so as to produce new polarity information data D55A indicative of this selected polarity information having the first certainty. Also, the data adding processor 26 produces new reliability information data D55B indicative of new reliability information of this new polarity information. When the reception processing speed of 1,200 bps is used, the data adding processor 26 sequentially selects one piece of polarity information having the first certainty every eight pieces (in total) of information data arranged by one piece of original information data D54A and seven pieces of repeated information data D54B subsequent to this original information data D54A so as to produce new polarity information data D55A indicative of this selected polarity information having the first certainty. Also, the data adding processor 26 produces new reliability information data D55B indicative of new reliability information of this new polarity information. As a result, when the reception processing speed of 2,400 bps is used in the data adding processor 26, the second soft-decision data D31 of 96 bits is generated from the first soft-decision data D28 of 384 bits; whereas when the reception processing speed of 1,200 bps is used, the second soft-decision data D32 of 48 bits is produced from the first soft-decision data D28 of 384 bits.

Also, in this case, every time the data processing operation for the first soft-decision data D28 of 384 bits is accomplished in the data adding processor 26, both the polarity comparison data D33B and D33C are sent from the data comparator 34 to the data speed predicting device 28, and further both the overflow data D34B and D34C are sent from the adding/subtracting device 35 to the data speed predicting device 28.

Figures 9, 10:
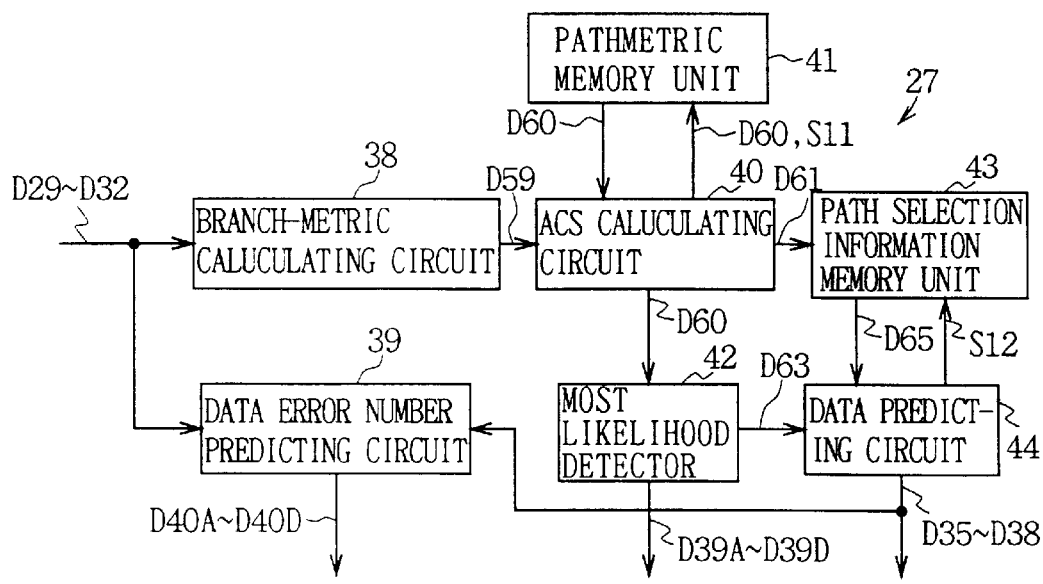
FIG. 9 is a block diagram for showing the circuit arrangement of a Viterbi decoder.
FIG. 10 is a table for explaining the second soft-decision data entered into the Viterbi decoder.

As indicated in FIG. 9 and FIG. 10, in the Viterbi decoder 27, the second soft-decision data D29 (reception processing speed of 9,600 bps is used) outputted from the data adding processor 26 is first inputted into a branch-metric calculating circuit 38 and a data error predicting circuit 39.

The branch-metric calculating circuit 38 calculates from the respective information data (polarity information and reliability information) of the second soft-decision data D29, a metric value (certainty) such that the polarity information of this information data is equal to "0", and also another metric value such that the polarity information is equal to "1". In this case, the branch-metric calculating circuit 38 represents the metric value (BM0 and BM1) such that the respective polarity information of each information data is equal to 0 and 1 by such values from "0 (the highest metric value)" to "F (the lowest metric value)" by employing, for example, hexadecimal number (see FIG. 10).

In addition, the branch-metric calculating circuit 38 calculates metric values (namely, branch-metric values of BM(0,0); BM(0,1); BM(1,0), and BM(1,1)) based on a metric calculation formula expressed by the following equation (5):

$$BM(0,0)=BM0(A)+BM0(B) \quad BM(0,1)=BM0(A)+BM1(B) \quad BM(1,0)= BM1(A)+BM0(B) \quad BM(1,1)=BM1(A)+BM1(B) \quad (5)$$

These metric values are equal to 4 sorts of code patterns in which 2-bit data of the second soft-decision data D29 are successively equal to (0,0); (0,1); (1,0); and (1,1) from top data thereof. Therefore, the branch-metric calculating circuit 38 sends out the 4 sorts of metric values sequentially acquired from the 2-bit data as metric value data D59 to an ACS (Add Compare Select) calculating circuit 40. It is assumed that among the 2-bit data used to calculate the branch-metric value, the metric value equal to 0 obtained from the 1-bit top data is set as BM0(A) and also the metric value equal to 1 is set as BM1(A), and further the metric value equal to 0 obtained from the 1-bit data subsequent to the top data is set as BM0(B) and also the metric value equal to 1 is set as BM1(B).

The ACS calculating circuit 40 is designed to select the most likelihood path from two paths which transits from preceding time instants to a plurality of conditions (hereinafter, referred to as "states") based on a so-called "trellis diagram" at the respective time instants. In this case, in such a trellis diagram whose constraint length "K" is set to 9, there are 256 sorts of independent state expressed by the following equation (6) every time instant:

$$\text{state number}=2^{(K-1)}=2^{9-1}=256 \quad (6)$$

As a consequence, every time the metric value data D59 indicative of the 4 sorts of branch-metric values BM(0,0); BM(0,1); BM(1,0); and BM(1,1) are inputted from the branch-metric calculating circuit 38 (namely, acquired from 2-bit data) into the ACS calculating circuit 40, this ACS calculating circuit 40 selects the most likelihood path (namely, selects remaining path) from the two paths which transit from the preceding time instant to 256 states by employing this metric value data. Also, the ACS calculating circuit 40 calculates a metric value of this selected path, and then sends out the calculated pathmetric value as metric data D60 to a pathmetric memory unit 41 so as to be stored therein. Additionally, the ACS calculating circuit 40 sends out the metric data D60 also to a most likelihood detector 42, and also supplies path selection information data D61 indicative of the selected path (namely, state of selected path before transit) to a path selection information memory unit 43 so as to be stored therein.

In this case, for example, while using the hexadecimal number of 2 digits (00 through FF), 256 states are indicated by that a new (new) state obtained from a calculation at the present time instant; and a state of a preceding time instant (old) are expressed by 00 (new) through FF (new) and 00 (old) through FF (old). A new pathmetric value and a pathmetric value of the preceding time instant in these 256 states are expressed by S00 (new) through SFF (new), and S00 (old) through SFF (old). Considering now a selection of a path in a state of new 00 (new), both a path for producing a code pattern of (0,0) from the 00 (old) state at the preceding time instant, and also another path for producing a code pattern of (1,1) from 80 (old) state will transit in the relevant state of 00 (new).

In this case, when the metric value data D59 indicative of the 4 sorts of branch-metric values BM(0,0), BM(0,1), BM(1,0), and BM(1,1) are entered from the branch-metric calculating circuit 38 into the ACS calculating circuit 40, this ACS calculating circuit 40 reads out the pathmetric values acquired at the preceding time instant as metric data D60 from the pathmetric memory unit 41 in response to a read signal S11. Then, this ACS calculating circuit 40 calculates a most likelihood pathmetric value in the above-described new 00 (new) state based on a calculation formula expressed by the following formula (7):

$$S00(new)a=S00(old)+BM(0,0)S00 \ (new) \ b=S80 \ (old)+BM(1,1)f \ (S00(new)a<S00(new)b)S00(new)=S00(new) \ a \ else \ S00(new)= S00(new)b \quad (7)$$

In this case, it should be understood that a most likelihood state of the pathmetric value is expressed as "0", and the metric values (certainties) are lowered every time the most likelihood states of the pathmetric values are sequentially increased from this "0". As described above, every time the metric value data D59 indicative of the 4 sorts of branch metric values BM(0,0), BM(0,1), BM(1,0), and BM(1,1) are inputted to this ACS calculating circuit 40, the ACS calculating circuit 40 sequentially calculates most likelihood pathmetric values of the 256 states.

Every time the metric data D60 related to the 256 states are entered from the ACS calculating circuit 40 into the most likelihood detector 42, a selection is made of one most likelihood pathmetric value (namely, the smallest pathmetric value) from the respective pathmetric values corresponding to these 256 states, and this smallest pathmetric value is supplied together with a state number corresponding thereto as most likelihood metric data D63 to a data predicting circuit 44. Also, only when one most likelihood pathmetric value is selected from the metric data D60 for the last state among the 256 states with respect to one piece of the second soft-decision data D29, the most likelihood detector 42 sends out the selected most likelihood metric data D63 to the data predicting circuit 44, and further sends out most likelihood pathmetric data D30A indicative of this selected most likelihood pathmetric value to the data speed predicting device 28.

Every time the most likelihood data D63 is inputted to a data predicting circuit 44, this data predicting circuit 44 sends out to a path selection information memory unit 43, a read signal S12 produced based on the state number indicated by this most likelihood metric data D63, and also reads as path selection data 65, all of states through which the remaining paths up to one state before this state transit and pass. As a consequence, the data predicting circuit 44 predicts decoded data (namely, executes most likelihood decoding operation) based upon the sequentially entered most likelihood metric data D63 and the path selection data D65 corresponding thereto. Then the data predicting circuit 44 supplies the resultant 192-bit decoded data D35 to a data error number predicting circuit 39 and an error detector 29.

The data error number predicting circuit 39 convolution-codes the decoded data D35, and thereafter compares the convolution-coded data D35 with the second soft-decision data D29 to thereby detect a predicted error number of the data. Then, the data error number predicting circuit 39 sends out this detected predicted error number as predicted error number data D40A to the data speed predicting device 28.

Figure 11:
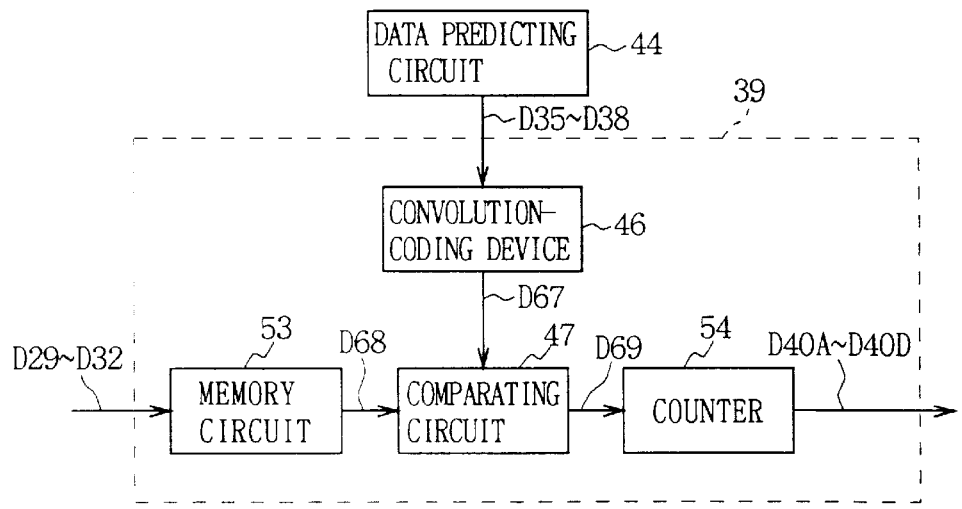
FIG. 11 is a block diagram for showing the circuit arrangement of a data error number predicting circuit.
Figure 12:
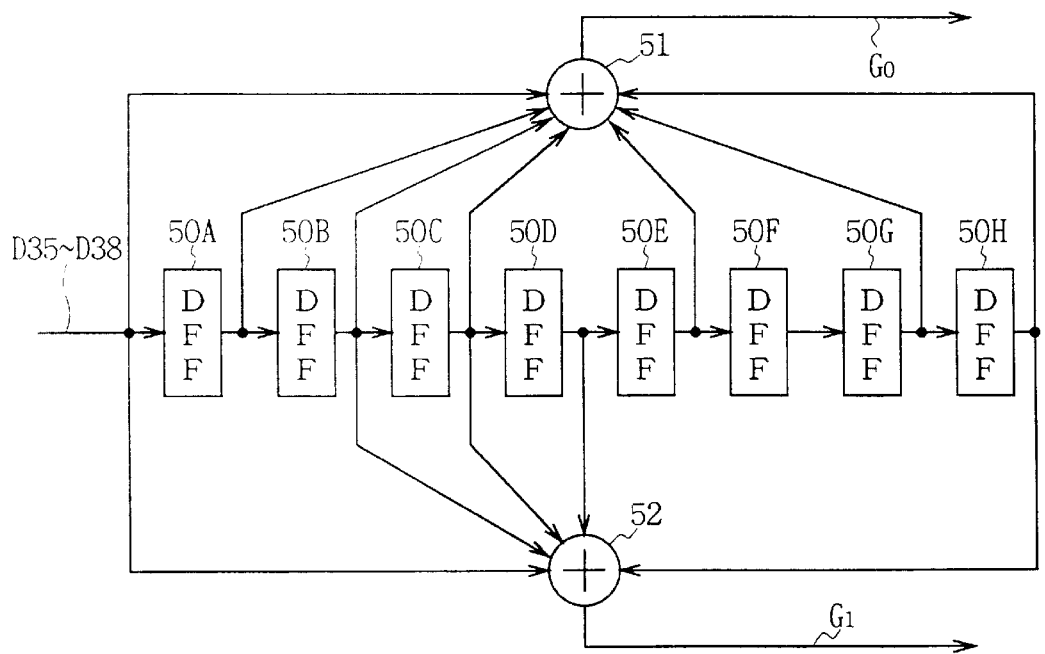
FIG. 12 is a block diagram for representing the circuit arrangement of a convolution codec.

In this case, as indicated in FIG. 11 and FIG. 12, in the data error number predicting circuit 39, the decoded data D35 is inputted into a convolution coding device 46 in which the constraint length "K" is set to K=9 and the coding ratio "R" is set to ½, so as to be convolution-coded. Thus, the resultant coded data D67 is entered into a comparing circuit 47.

For instance, the convolution coding device 46 is made of, e.g., 8-staged delay circuits (DFF) 50A to 50H for constituting a shift register, and sequentially delays the decoded data D35 every 1 bit by preselected delay time. Then, a first adder 51 adds 1-bit data of the decoded data 35 (hereinafter, referred to as "input data") entered into this convolution coding device 46 to 1-bit data outputted from the delay circuits 50A, 50B, 50C, 50E, 50G, and 50H, respectively, based upon a generating polynomial $G_0$ expressed by the following formula (8):

$$G_0: 753(\text{octal}) \tag{8}$$

Therefore, the resultant first addition data $G_0$ is supplied to the comparing circuit 47. Also, a second adder 52 adds the input data to 1-bit data outputted from the delay circuits 50B, 50C, 50D, and 50H, respectively, based upon a generating polynomial G, expressed by the following formula (9):

$$G_1: 561(\text{octal}) \tag{9}$$

Therefore, the resultant second addition data $G_1$ is supplied to the comparing circuit 47. As a result, the convolution decoding device 46 sequentially produces 2-bit data with respect to the 1-bit data of the decoded data D35, and then convolution-codes this decoded data D35 (see FIG. 11).

Also, in the data error number predicting circuit 39, the second soft-decision data D29 is inputted to a memory circuit 53, the memory circuit 53 sequentially stores thereinto only the polarity information of the second soft-decision data D29 from the top data thereof. Then, the memory circuit 53 sequentially sends out the corresponding polarity information as polarity information data D68 to the comparing circuit 47 in synchronism with the first addition data $G_0$ and the second addition data $G_1$ sequentially outputted from the convolution-coding device 46.

The comparing circuit 47 compares a value (1 or 0) indicative of the first addition data $G_0$ corresponding thereto and inputted in the synchronization manner with another value (1 or 0) indicative of the polarity information D68, and further compares a value (1 or 0) indicative of the second addition data $G_1$ corresponding thereto and inputted in the synchronization manner with another value (1 or 0) indicative of the polarity information D68 so that the polarity information for the 384-bit data is sequentially compared with each other. Every time the comparison result about the incoincidence is obtained, this comparing circuit 47 sends out incoincident data D69 to a counter 54.

Every time this incoincident data D69 is entered, the counter 54 counts up. When the comparing operations of the polarity information for the 384-bit data are accomplished in the comparing circuit 47, the counter 54 supplies the counted values (namely, a total error number predicted such that errors happen to occur in decoded data D35) as predicted error number data D40A to the data speed predicting device 28.

Similar to the above-described case of the second soft-decision data D29 inputted in the reception processing speed of 9,600 bps, the Viterbi decoder 27 executes the decoding processing operation for the second soft-decision data D30 to D32 entered in the reception processing speeds of 4,800 bps, 2,400 bps, and 1,200 bps from the data adding processor 26 to thereby produce decoded data D36 to D38, and to further produce the most likelihood pathmetric data D39B to D39D, and also the predicted error number data D40B to D40D.

As previously explained, when the transmission processing speed is predicted, the data speed predicting device 28 may predict such a transmission processing speed based upon the error detection data D42A, and D24B, the most likelihood pathmetric data D39A to D39D, the predicted error number data D40A to D40D, the polarity comparison data D33A to D33C, and overflow data D34A to D34C, which are acquired in the 4 sorts of reception processing with respect to 1 piece (384 bits) of decoded data D8.

A description will now be made of the error detection result, the most likelihood pathmetric values, the predicted error numbers, the polarity incoincident numbers, and the overflow numbers, which are acquired when the same 4 sorts of reception processing speeds are used in the communication terminal 1 with respect to the 4 sorts of transmission processing speeds used in the transmission processing. Then following descriptions are made in such a case that the line quality of the Viterbi decoder 27 is relatively high (namely, when there is a relatively small number of errors occurred in decoded data D35 to D38), and also in such a case that the line quality is relatively low (namely, when there are relatively large numbers of errors occurred in decoded data D35 to D38) under such a condition that the transmission output of the reception data D7 transmitted from the base station is controlled in a similar manner when the transmission data D6 is transmitted from the above-described communication terminal 1 (transmission output is lowered when transmission processing speed is relatively low).

As indicated in FIG. 13, if the error detector 29 first detects the errors of the decoded data D35 and D36 in such a case that the line quality is relatively high, and the transmission processing speed is different from the reception processing speed, then these decoded data D35 and 36 can be accidentally divided by the generating polynomial G1 (X) and G2 (X) corresponding thereto, so that the error detector 29 makes an erroneous judgment such that no error happens to occur therein. As a result, in this case, both the error detection data D42A and D24B may correctly express the error detection results of the decoded data D35 and D36 when the transmission processing speeds (namely, 9,600 bps and 4,800 bps) are identical to the reception processing speeds.

However, when the line quality is relatively low, even if the transmission processing speeds (namely, 9,600 bps and 4,800 bps) are equal to the reception processing speeds, the error detector 29 makes an erroneous judgment while detecting the errors contained in the decoded data D35 and D36. Accordingly, this case, both the error detection data D42A and D42B represent the erroneously-judged error detection result.

The most likelihood pathmetric value becomes a relatively small value (namely, certainty becomes relatively high) in the case that the line quality is relatively high while substantially no error occurs in the polarity information of the second soft-decision data D29 to D32, and also in such a case that since the reception data D7 having the relatively high reliability is reception processed in such a reception processing speed higher than the actually used transmission processing speed, this reception data D7 is attenuated to thereby acquire the second soft-decision data D29 to D32 having relatively low reliability.

Also, the most likelihood pathmetric value becomes a relatively large value (namely, certainty becomes relatively low) in the case that since a relatively large number of errors occur in the polarity information of the second soft-decision data D29 to D32, the branch-metric value is different from the actual value, i.e., line quality is relatively low; in such a case that since the reception data D7 having the relatively low reliability is reception processed in such a reception processing speed lower than the actually used transmission processing speed, the second soft-decision data D29 to D32 having the relatively high reliability are obtained; and furthermore in the case that when the second soft-decision data D29 to D32 are Viterbi-decoded in the reception processing speed higher than the actually used transmission processing speed, the second soft-decision data D29 to D32 own code patterns capable of readily losing a continuity (continuity of 1, or 0).

When the line quality is actually relatively high, the most likelihood pathmetric values obtained when the transmission processing speed is equal to the reception processing speed become the smallest values. It should be understood that even when the transmission processing speed is different from the reception processing speed, in such a case that the same polarity information is continued (for example, "0" is continued) in the second soft-decision data D29 to D32, the most likelihood pathmetric values become relatively small values. Thus, there is a possibility that these relatively small most likelihood pathmetric values are nearly equal to the most likelihood pathmetric values obtained when the transmission processing speed is equal to the reception processing speed.

When the line quality is relatively low, there is such a trend that the most likelihood pathmetric values obtained when the transmission processing speed is equal to the reception processing speed become smaller than those obtained when this transmission processing speed is different from the reception processing speed (note that the first-mentioned most likelihood pathmetric values become larger than most likelihood pathmetric values obtained when line quality is relatively high, and transmission processing speed is equal to reception processing speed). However, there are great possibilities that the most likelihood pathmetric values obtained when the transmission processing speed is equal to the reception processing speed are very approximated to those obtained when the transmission processing speed is different from the reception processing speed, depending upon the arrangement ways of the polarity information in the second soft-decision data D29 to D32, and the error occurrence ways of those second soft-decision data D29 to D32.

The predicted error number becomes a relatively small value in the following cases: That is, the quality of the transfer path is relatively high after the second soft-decision data D29 to D32 are Viterbi-decoded until the Viterbi-decoded second soft-decision data are convolution-coded, and thus there is a relatively small error in the polarity information. Also, the same polarity information is continued in the second soft-decision data D30 to D32 obtained by using the relatively low reception processing speed (namely, lower than 9,600 bps). Also, the predicted error number becomes a relatively large value in the following cases: That is, the quality of the transfer path is relatively high after the second soft-decision data D29 to D32 are Viterbi-decoded until the Viterbi-decoded second soft-decision data are convolution-coded, and thus there are relatively large errors in the polarity information. Also, the transmission processing speed is different from the reception processing speed.

When the line quality is actually relatively high, the predicted error values obtained when the transmission processing speed is equal to the reception processing speed becomes the smallest values. It should be understood that as previously explained, even when the transmission processing speed is different from the reception processing speed, in such a case that the same polarity information is continued (for example, "0" is continued) in the second soft-decision data D29 to D32, the predicted error values become relatively small values. Thus, there is a possibility that these relatively small predicted error values are nearly equal to the predicted error values obtained when the transmission processing speed is equal to the reception processing speed. When the line quality is relatively low, there is such a trend that the predicted error values obtained when the transmission processing speed is equal to the reception processing speed become smaller than those obtained when this transmission processing speed is different from the reception processing speed (note that the first-mentioned predicted error values becomes larger than predicted error values obtained when line quality is relatively high, and transmission processing speed is equal to reception processing speed).

A polarity incoincidence will occur in such a case that there is relatively small continuous polarity information (0 or 1) exceeding one repetition range of polarity information, and further a reception processing speed lower than a transmission processing speed is used, and also when there are relatively large errors in the soft-decision data D28. In an actual case, the polarity incoincident number becomes a relatively small value when the transmission processing speed is equal to the reception processing speed, and also when the reception processing speed higher than this transmission processing speed is used, whereas the polarity incoincident number becomes a relatively large value when the reception processing speed lower than this transmission processing speed is used irrespective to the line quality.

An overflow happens to occur in such a case that a reception processing speed lower than a transmission processing speed is used, and also relatively large number of errors happen to occur in the first soft-decision data D28. In an actual case, the overflow number becomes a relatively large value every time the reception processing speeds sequentially lower than the transmission processing speed are used irrespective to the line quality.

There is such a trend that both the most likelihood pathmetric value and the predicted error number are successively increased in accordance with such a fact that the reception processing speed used in the reception processing is successively increased, and thus the bit numbers (data amounts) of the decoded data D35 to D38 acquired in these reception processing are successively increased. As a consequence, in the data speed predicting device 28, when both the most likelihood pathmetric value and the predicted error number are employed so as to predict the transmission processing speed, the bit numbers (data amounts) of the decoded data D35 to D37 are corrected which are acquired by such reception processing using the respective reception processing speeds of 9,600 bps, 4,800 bps, and 2,400 bps, while using as a reference the bit number (data amount) of the decoded data D38 acquired by such a reception processing with employment of the reception processing speed of, for example, 1,200 bps. Then in this data speed predicting device 28, based on these corrected decoded data D35 to D37, both the most likelihood pathmetric value and the predicted error number corresponding thereto are corrected to be used.

Figure 14:
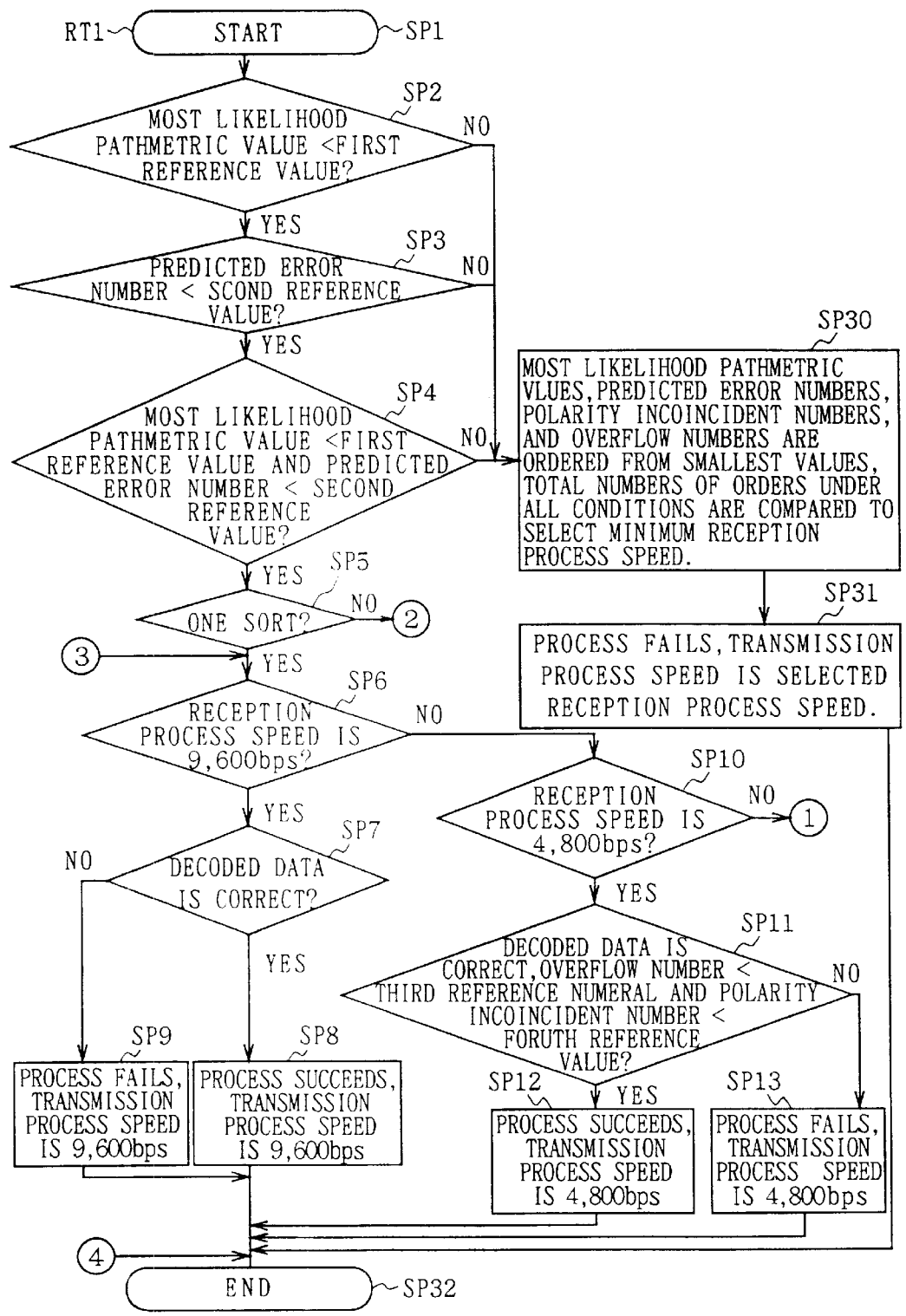
FIGS. 14 to 16 are flow charts for explaining a transmission processing speed prediction procedure for predicting a transmission processing speed in a data speed predicting device.
Figure 15:
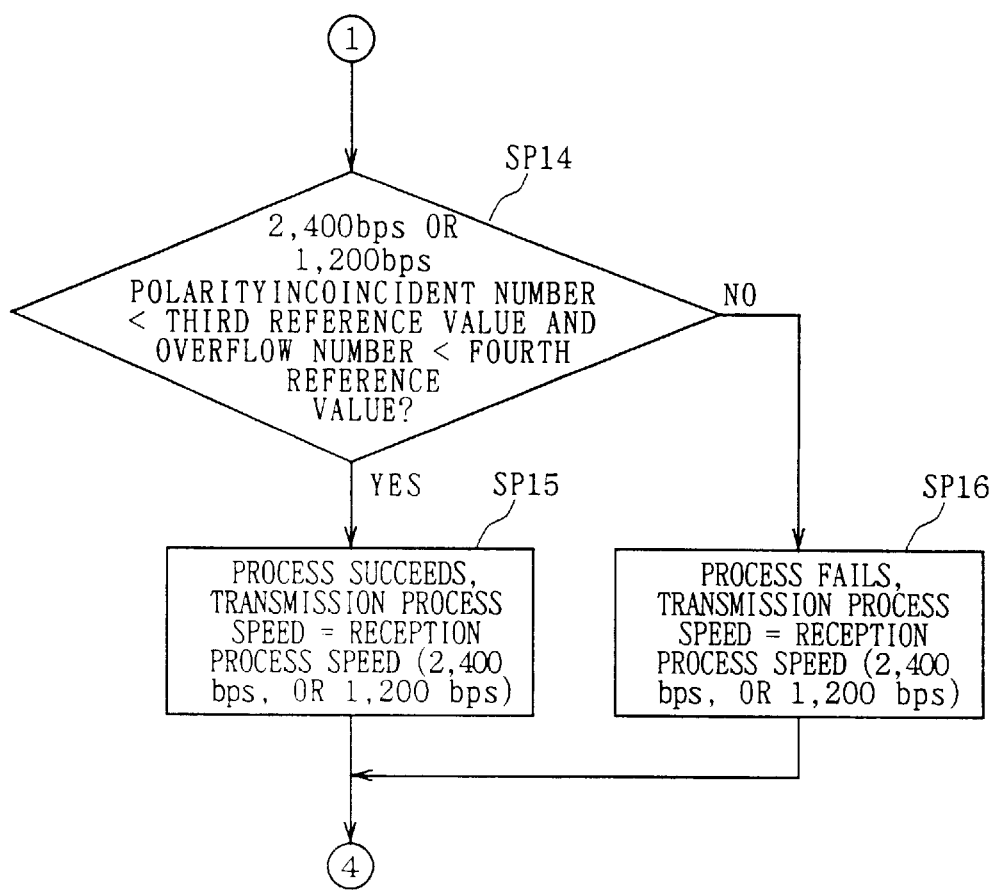
Figure 16:
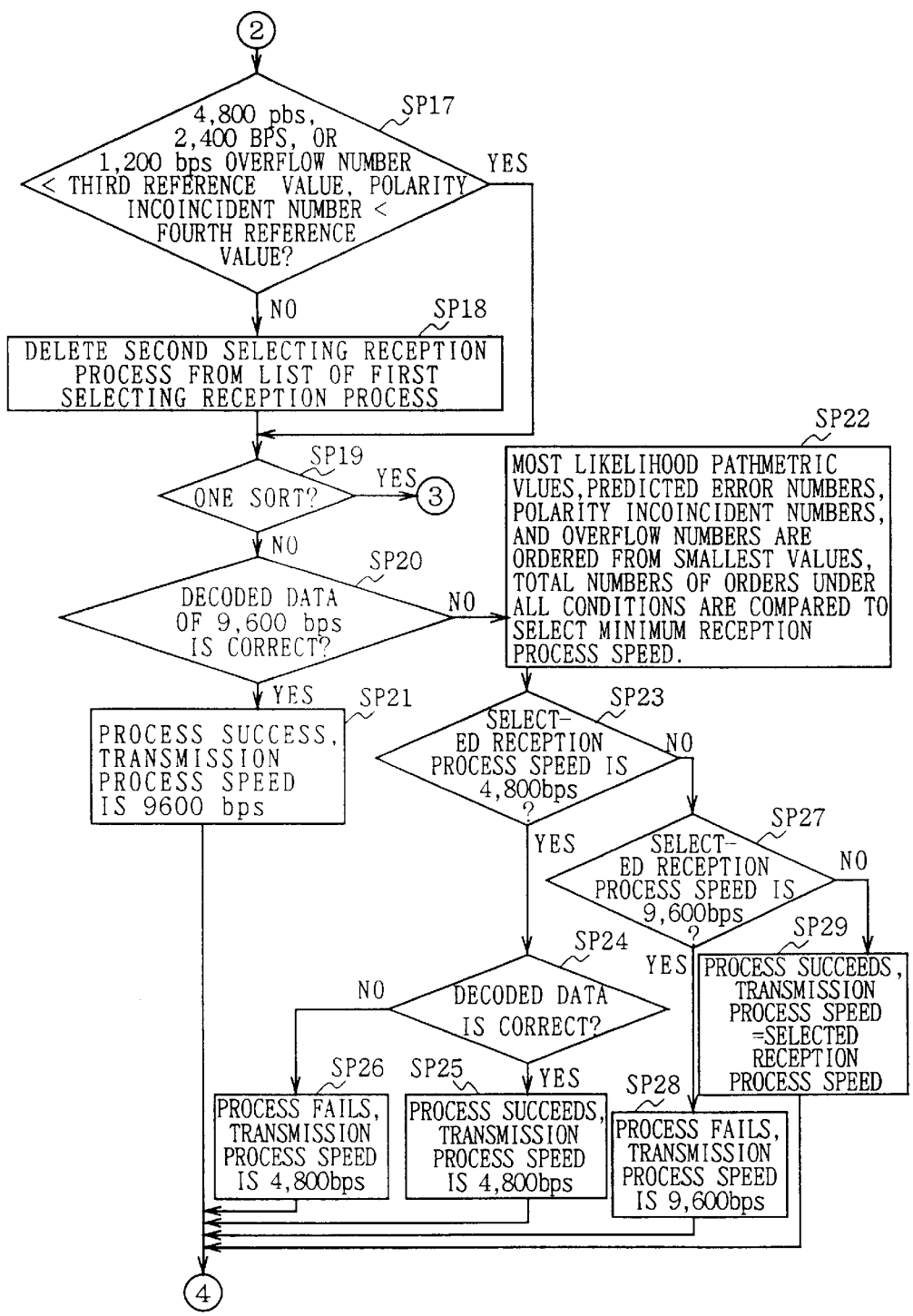

When the data speed predicting device 28 predicts the transmission processing speed practically used in the transmission processing with respect to the reception data D7, the following reception processing are sequentially executed, i.e., the reception processing where the reception processing speed of 9,600 bps is used; the reception processing where the reception processing speed of 4,800 bps is used; the reception processing where the reception processing speed of 2,400 bps is used; and the reception processing where the reception processing speed of 1,200 bps is used with respect to the 384-bit demodulation data D8 obtained from the 384-bit reception data D7. When both the error detection data D42A and D42B, the most likelihood pathmetric data D39A to D39D, the predicted error number data D40A to D40D, the polarity comparison data D33A to D33C, and the overflow data D34A to D34C are entered into this data speed predicting device 28 in correspondence with the reception processing speeds used in each of the reception processing, a processing operation RT1 for predicting a transmission processing speed shown in FIG. 14, FIG. 15, and FIG. 16 is commenced. Thus, this processing operation is advanced from a step SP1 to a step SP2.

In this case, at this step SP2, the data speed predicting device 28 sequentially compares the most likelihood pathmetric values indicated by the 4 sorts of most likelihood pathmetric data D39A to D39D with a preset first reference value, and thus judges as to whether or not there is such a reception processing that the most likelihood pathmetric value smaller than this first reference value can be acquired. When the judgment result becomes "YES", this predicting processing operation is advanced to step SP3. At this step SP3, the data speed predicting device 28 sequentially compares the predicted error numbers indicated by the 4 sorts of predicted error number data D40A to D40D with a preset second reference value, and thus judges as to whether or not there is a predicted error number smaller than this second reference value. When the judgment result becomes YES at this step SP3, the predicting processing operation is advanced to step SP4. At this step SP4, the data speed predicting device 28 judges as to whether or not such a reception processing is present. That is, in this reception processing (hereinafter, referred to as a "first selecting reception processing"), the most likelihood pathmetric value smaller than the first reference value is acquired in the 4 sorts of reception processing, and further the predicted error number smaller than the second reference value is obtained. When the judgment result becomes YES, the predicting processing operation is advanced to step SP5.

At this step SP5, the data speed predicting device 28 judges as to whether or not the first selecting reception processing is one sort. When the judgment result becomes YES, the predicting processing operation is advanced to step SP6 at which another check is done as to whether or not the reception processing speed used in this one sort of first selecting reception processing is equal to 9,600 bps. When the judgment result becomes YES, the data speed predicting device 28 predicts that this reception processing speed of 9,600 bps is equal to the transmission processing speed actually used when the reception data D7 is transmission-processed. Then, the predicting processing operation is advanced to a step SP7 at which another check is made as to whether or not the decoded data D35 is correct based on the error detection data D42A, namely whether or not an error happens to occur.

At this time, if the judgment result of YES is made at the previous step SP7, then the data speed predicting device 28 judges that the Viterbi decoding operation of the first selecting reception processing (namely, reception processing with using reception processing speed of 9,600 bps) succeeds. Accordingly, the predicting processing operation is advanced to a step SP8. At this step SP8, processing success data D50 for indicating that this Viterbi decoding operation could succeed is supplied to the controller 7, and further predicted speed data D48 for indicating that the predicted transmission processing speed is 9,600 bps is supplied to the data selector 30. Conversely, if the judgment result of NO (namely, error occurs in decoded data D35) at the step SP7, then the data speed predicting device 28 judges that the Viterbi decoding operation of the first selecting reception processing (namely, reception processing with using reception processing speed of 9,600 bps) fails. Accordingly, the predicting processing operation is advanced to a step SP9. At this step SP9, processing fail data D51 for indicating that this Viterbi decoding operation fails is supplied to the controller 7, and further predicted speed data D48 for indicating that the predicted transmission processing speed is 9,600 bps is supplied to the data selector 30.

It should be understood that when the judgment result of "NO" is made at the step SP6 (namely, when reception processing speed used in first selecting reception processing is different from 9,600 bps), the predicting processing operation is advanced to a step SP10 at which the data speed predicting device 28 judges as to whether or not the reception processing speed used in one sort of the first selecting processing operation is equal to 4,800 bps, whereas when the judgment result of YES is made, the data speed predicting device 28 predicts that the reception processing speed of 4,800 bps is equal to the transmission processing speed which is actually used when the reception data D7 is transmission-processed. Then, the predicting processing operation is advanced to step SP11 at which the data speed predicting device 28 judges as to whether or not the decoded data D36 is correct based on the error detection data D42B. The polarity incoincident number represented by the polarity comparison data D33A is compared with the third reference value previously set so as to judge whether or not the polarity incoincident number is smaller than the third reference value, and the overflow number represented by the overflow data D34A is compared with the fourth reference value previously set so as to judge whether or not the overflow number is smaller than the fourth reference value.

As described above, when the judgment result of YES is made at this step SP11, the data speed predicting device 28 judges that the Viterbi decoding operation of the first selecting reception processing (namely, reception processing in which reception processing speed of 4,800 bps is used) can succeed. Then, the predicting processing operation is advanced to a step SP12. At this step SP12, the data speed predicting device 28 sends out processing success data D50 to the controller 7, and further supplies prediction speed data D48 for indicating that the predicted transmission processing speed is 4,800 bps to the data selector 30. Conversely, when the judgment result of NO (namely, error occurs in decoded data D36) is made at this step SP11, the data speed predicting device 28 judges that the Viterbi decoding operation of the first selecting reception processing (namely, reception processing in which reception processing speed of 4,800 bps is used) fails. Then, the predicting processing operation is advanced to a step SP13. At this step SP13, the data speed predicting device 28 sends out processing fail data D51 to the controller 7, and further supplies the prediction speed data D48 for indicating that the predicted transmission processing speed is 4,800 bps to the data selector 30.

When the judgment result of "NO" (namely, reception processing speed used in first selecting reception processing is different from 4,800 bps) is made at the step SP10, the predicting processing operation is advanced to a step SP14 at which the data speed predicting device 28 judges as to whether the reception processing speed used in one sort of first selecting reception processing is equal to 2,400 bps, or 1,200 bps. Then, the data speed predicting device 28 predicts that the reception processing speed indicated by this judgment result is equal to such a transmission processing speed which is actually used in the transmission processing for the reception data D7. Also, the data speed predicting device 28 compares a polarity incoincident number indicated by the polarity comparison data D33C, or D33D inputted in this first selecting reception processing with a preset third reference value so as to judge as to whether or not the polarity incoincident number is smaller than the third reference value, and further compares an overflow number indicated by the overflow data D34B or D34C with a preset fourth reference value in order to judge as to whether or not the overflow number is smaller than this fourth reference value.

At this time, when the judgment result of "YES" is obtained respectively as two judgment results at the step SP14, the data speed predicting device 28 judges that the second soft-decision data D31 or D32 is correct: As a result, the data speed predicting device 28 judges that the decoded data D37, or D38 produced by Viterbi-decoding this second soft-decision data D31 or D32 is similarly correct. As a consequence, the predicting processing operation is advanced to a step SP15 at which the data speed predicting device 28 sends out the processing success data D50 to the controller 7, and also sends out the prediction speed data D48 to the data selector 30. This prediction speed data D48 indicates that the predicted transmission processing speed is equal to be 2,400 bps, or 1,200 bps.

When the judgment result of "NO" is obtained from at least one judgment result among two judgment results at the step SP14, the data speed predicting device 28 judges that an error happens to occur in the second soft-decision data D31 or D32. As a result, the data speed predicting device 28 judges that an error happens to occur in the decoded data D37 or D38 produced by Viterbi-decoding this second soft-decision data D31 or D32. As a consequence, the predicting processing operation is advanced to a step SP16 at which the data speed predicting device 28 sends out the processing fail data D51 to the controller 7, and also sends out the prediction speed data D48 to the data selector 30. This prediction speed data D48 indicates that the predicted transmission processing speed is equal to be 2,400 bps, or 1,200 bps.

When the judgment result of "NO" (namely, there are two to four sorts of first selecting reception processing) is made at the step SP5, the predicting processing operation is advanced to a step SP17. At this step SP17, the data speed predicting device 28 selects a second selecting reception processing in which the reception processing speeds of 4,800 bps, 2,400 bps and 1,200 bps among the respective first selecting processing operations are used. Also, the data speed predicting device 28 compares a polarity incoincident number with respect to each of the selected second selecting reception processing with the third reference value so as to judge as to whether or not the polarity incoincident number is smaller than the third reference value, and further compares an overflow number with fourth reference value in order to judge as to whether or not the overflow number is smaller than this fourth reference value.

As a consequence, when there is such a second selecting reception processing at the step SP17 where the judgment result of "NO" is made from at least one judgment result from the two judgement results, the predicting processing operation is advanced to a subsequent step SP18. At this step SP18, the data speed predicting device 28 deletes this second selecting reception processing where this judgment result of "NO" is obtained from the list of the first selecting reception processing. Then, the predicting processing operation is advanced to a step SP19. When the judgment result of "YES" are obtained from the two judgment results of all of the second selecting reception operations at the step SP17, the predicting processing operation by the data speed predicting device 28 is advanced to a step SP19, while leaving the first selecting reception processing.

Next, the data speed predicting device 20 judges as to whether or not the first selecting reception processing is 1 sort at the step SP19. If the judgment result of "YES" is made at the step SP19, then the predicting processing operation is advanced to the step SP6. Thereafter, as explained above, the data speed predicting device 28 executes the processing operations defined from the step SP6 to the step SP16. Conversely, if the judgment result of "NO" is made at the step SP19, then the predicting processing operation is advanced to a step SP20. At this step SP20, when the first selecting reception processing in which the reception processing speed of 9,600 bps is used is involved in each of the first selecting reception processing, the data speed predicting device 28 judges as to whether or not the decoded data D35 is correct based upon the error detection data D42A.

At this stage, when the judgment result of "YES" is made at the step SP20, the data speed predicting device 20 predicts that the reception processing speed of 9,600 bps is equal to such a transmission processing which is actually used during the transmission processing of the reception data D7. Also, the data speed predicting device 28 judges that the Viterbi decoding operation of the first selecting reception processing (namely, reception processing in which reception processing speed of 9,600 bps is used) can succeed. Then, the predicting processing operation is advanced to a step SP21 at which the data speed predicting device 28 sends out the processing success data D50 to the controller 7, and also sends out the prediction speed data D48 for indicating that the predicted transmission processing speed is 9,600 bps to the data selector 30.

At the step SP20, when such a judgment result is made that the first selecting reception processing in which the reception processing speed of 9,600 bps is used is not involved in each of the first reception processing, or the judgment result of "NO" is made (namely, error happens to occur in decoded data SD35), the predicting processing operation by the data speed predicting device 28 is advanced to a further step SP22. At this step SP22, the following comparing operations are performed: First, the most likelihood pathmetric values corrected in each of the first selecting processing operations (will be referred to as "most likelihood pathmetric correction values" hereinafter) are compared with each other. The corrected predicted error numbers (will be referred to as "predicted error correction number" hereinafter) are compared with each other. The polarity incoincident numbers are compared with each other. The overflow numbers are compared with each other. Then, the data speed predicting device 28 orders these values in such a manner that the smallest values become first with respect to each of the most likelihood pathmetric correction values, each of the predicted error correction values, each of the polarity incoincident numbers, and each of the overflow numbers. In addition, the data speed predicting device 28 makes a sum of order numbers which are given to the most likelihood pathmetric correction value, the predicted error correction number, the polarity incoincident number, and the overflow number every first selecting reception processing. Then, the data speed predicting device 28 compares the total values with each other with respect to each of the first selecting reception processing. As a result, the data speed predicting device 28 selects such a first selecting reception processing in which the total value is minimum, and may predict that the reception processing speed used in this selected first selecting reception processing is equal to the transmission processing speed actually used in the transmission processing for the reception data D7.

Next, the predicting processing operation is advanced to a step SP23 at which the data speed predicting device 28 judges as to whether or not the reception processing speed used in the selected first selecting reception processing is equal to 4,800 bps. If the judgment result of "YES" is made, then the data speed predicting device 28 predicts that this reception processing speed of 4,800 bps is equal to such a transmission processing speed actually used in the transmission processing for the reception data D7. Thereafter, the predicting processing operation is advanced to a step SP24 at which the data speed predicting device 28 judges as to whether or not the decoded data D36 is correct based on the error detection data D42B.

At this time, if the judgment result of YES is made at the step SP24, then the data speed predicting device 28 judges that the Viterbi decoding operation of the first selecting reception processing (namely, reception processing with using reception processing speed of 4,800 bps) succeeds. Accordingly, the predicting processing operation is advanced to a step SP25. At this step SP25, the processing success data D50 is supplied to the controller 7, and further predicted speed data D48 for indicating that the predicted transmission processing speed is 4,800 bps is supplied to the data selector 30. Conversely, if the judgment result of NO (namely, error occurs in decoded data D36) at the step SP24, then the data speed predicting device 28 judges that the Viterbi decoding operation of the first selecting reception processing (namely, reception processing with using reception processing speed of 4,800 bps) fails. Accordingly, the predicting processing operation is advanced to a step SP26. At this step SP26, the processing fail data D51 is supplied to the controller 7, and further predicted speed data D48 for indicating that the predicted transmission processing speed is 4,800 bps is supplied to the data selector 30.

It should be understood that when the judgment result of "NO" is made at the step SP23 (namely, when reception processing speed used in first selecting reception processing is different from 4,800 bps), the predicting processing operation is advanced to a step SP27 at which the data speed predicting device 28 judges as to whether or not the reception processing speed used in the first selecting processing operation is equal to 9,600 bps. When the judgment result of YES is made, the predicting processing operation by the data speed predicting device 28 is advanced to a step SP28. At this step SP28, since the data speed predicting device 28 has judged that the error has occurred in the decoded data D35 at the step SP20, the data speed predicting device 28 sends out the processing fail data D51 to the controller 7, and also the predicted speed data D48 for indicating that the predicted transmission processing speed is 9,600 bps to the data selector 30.

When the judgment result of "NO" is made at the step SP27, the predicting processing operation is advanced to a step SP29 at which the data speed predicting device 28 judges as to whether the reception processing speed used in the first selecting reception processing is equal to 2,400 bps, or 1,200 bps. Then, the data speed predicting device 28 predicts that the reception processing speed indicated by this judgment result is equal to such a transmission processing speed which is actually used in the transmission processing for the reception data D7. Also, since the data speed predicting device 28 has already judged at the previous step SP17 such that the polarity incoincident number is smaller than the third reference value and furthermore the overflow number is smaller than the fourth reference value, this data speed predicting device 28 may judge that the decoded data D37 or D38 is corrected similar to the previous case. Accordingly, the data speed predicting device 28 sends out the processing success data D50 to the controller 7, and also the prediction speed data D48 for indicating that the predicted transmission processing speed is 2,400 bps, or 1,200 bps to the data selector 30.

In the case that the judgment result of "NO" is made at least one of the above-described step SP2, step SP3, and step SP4, the predicting processing operation is advanced to a further step SP30. At this step SP30, the following comparing operations are performed by the data speed predicting device 28: First, the most likelihood pathmetric values in each of the selecting processing operations are compared with each other. The corrected predicted error numbers are compared with each other. The polarity incoincident numbers are compared with each other. The overflow numbers are compared with each other. Then, the data speed predicting device 28 orders these values in such a manner that the smallest values become first with respect to each of the most likelihood pathmetric correction values, each of the predicted error correction values, each of the polarity incoincident numbers, and each of the overflow numbers. In addition, the data speed predicting device 28 makes a sum of order numbers which are given to the most likelihood pathmetric correction value, the predicted error correction number, the polarity incoincident number, and the overflow number every reception processing. Then, the data speed predicting device 28 compares the total values with each other with respect to each of the respective reception processing. As a result, the data speed predicting device 28 selects such a reception processing in which the total value is minimum, and may predict that the reception processing speed used in this selected reception processing is equal to the transmission processing speed actually used in the transmission processing for the reception data D7.

Next, the predicting processing operation is advanced to a step SP31 at which the data speed predicting device 28 judges that an error happens to occur in the decoded data D35, D36, D37, or D38 based on such a fact that the most likelihood pathmetric value is larger than the first reference value, and/or the predicted error number is larger than the second reference value. As a result, the data speed predicting device 28 sends out the processing fail data D51 to the controller 7, and the prediction speed data D48 for indicating the predicted transmission processing speed to the data selector 30.

As a consequence, as explained above, the data speed predicting device 28 predicts the transmission processing speed which is actually used when the reception data D7 is transmission-processed. Thus, the data speed predicting device 28 sends out either the processing success data D50 or the processing fail data D51 to the controller 7 at the step SP8, step SP9, step SP12, step SP13, step SP15, step SP16, step SP25, step SP26, step SP28, step SP29, or step SP31. After the prediction speed data D48 indicative of the predicted transmission processing speed is sent to the data selector 30, the predicting processing operation by the data speed predicting device 28 is advanced to a step SP32 at which the sequential processing operation (RT1) for predicting the transmission processing speed is accomplished. It should be noted that the first to fourth reference values are selected to be arbitrary values acquired from the theoretical calculations and the experimental calculations.

With employment of the above-described arrangement, in the communication terminal 1, when the transmission processing speed is predicted, the data speed predicting device 28 firstly compares each of the four sorts of most likelihood pathmetric values with the first reference value, and also compares each of the four sorts of prediction error numbers with the second reference value so as to judge as to whether or not the first selecting reception processing is present. In this case, in the communication terminal 1, since both the most likelihood pathmetric value and the prediction error number become the smallest values respectively, which are acquired when the reception processing is carried out by using such a reception processing speed coincident with the actually used transmission processing speed, if there is only one sort of first selecting reception processing, then this data speed predicting device can predict that the reception processing speed used in this first selecting reception processing is equal to such a transmission processing speed which is actually used during the transmission processing for the reception data D7 processed by this reception processing.

Next, in the communication terminal 1, in such a case that there are plural sorts of first selecting reception processing the data speed predicting device 28 compares each of the polarity incoincident numbers in the first selecting reception processing with the third reference value. Also, the data speed predicting device 28 compares the overflow number with the fourth reference value, and if there is the second selecting reception processing in which the negative result is obtained from at least one judgement result, then this second selecting reception processing is removed from each of the first selecting reception processing. In this case, in the communication terminal 1, when the reception processing is carried out while using the reception processing speed lower than the actually used transmission processing speed, since both the polarity incoincident number and the overflow number become relatively large numbers irrespective of the respective line conditions, the second selecting reception processing is removed from the first selecting reception processing. As a consequence, the communication terminal 1 can avoid such an erroneous prediction of the reception processing speed lower than the actually used transmission processing speed as this transmission processing speed.

Subsequently, in the communication terminal 1, in such a case that there are still plural numbers of first selecting reception processing, the data speed predicting device executes the comparing operations between the most likelihood pathmetric values, the prediction error numbers, the polarity incoincident numbers, and the overflow numbers of each of the first selecting reception processing. Then, the data speed predicting device orders these compared values, and also sums the respective order numbers every first selecting reception processing. In accordance with this communication terminal 1, even when the transmission processing speed can be hardly predicted only by comparing the first to fourth reference values with the most likelihood pathmetric value, the prediction error number, the polarity incoincident number, and the overflow number corresponding thereto, as apparent from FIG. 13, such a reception processing speed of the first selecting reception processing having the smallest total value of the order numbers acquired in each of the reception processing can be predicted as the actually used transmission processing speed.

Also, in the communication terminal 1, since the four sorts of most likelihood pathmetric values are compared with the first reference value and/or the four sorts of prediction error numbers are compared with the second reference value when the transmission processing speed is started to be predicted, even when the line condition is relatively low and there is no first selecting reception processing, this transmission processing speed can be predicted in a similar prediction manner of the transmission processing speed from a plurality of first selecting reception processing.

As a result, in the communication terminal 1, even when since the line condition is relatively low (namely, relatively large number of errors happen to occur in decoded data D35, D36, D37, or D38), the respective most likelihood pathmetric values acquired by the first selecting reception processing becomes substantially same values, or the respective prediction error numbers become substantially same numbers, the erroneous prediction of this transmission processing speed can be greatly reduced, so that this transmission processing speed can be correctly predicted by adding the polarity incoincident number and the overflow number to predict this transmission processing speed, which are acquired without being adversely influenced by this line condition. Also, in the communication terminal 1, even when the reception data D7 is received which has been transmitted without adding thereto the CRC code, the transmission processing speed can be predicted without being adversely influenced.

Moreover, in the communication terminal 1, when the data speed predicting device predicts that the transmission processing speed is equal to either 2,400 bps or 1,200 bps, the data speed predicting device judges as to whether or not the second soft-decision data D31 or D32 is correct based upon the polarity incoincident number and the overflow number. Based upon this judgment result, the data speed predicting device judges as to whether or not the decoded data D37, or D38 is correct, which is acquired by Viterbi-decoding the second soft-decision data D31, or D32. As a result, it is also possible to judge as to whether or not the Viterbi-decoding reception processing can succeed with respect to such reception data D7 which has been transmitted without adding the CRC code thereto. It should be understood that in this embodiment, since the 16-value soft-decision data is used in the reception processing, the coding gain during the Viterbi-decoding operation can be increased.

In accordance with the above-described arrangement, the first soft-decision data D28 is sequentially and repeatedly transmitted from the deinterleaver 25 by successively using the 4 sorts of reception processing speeds one by one. In the data adding processor 26, the polarity information whose total number is larger than the repetition number by one, corresponding to each of the reception processing speeds is sequentially compared with each other so as to detect the polarity information incoincident number, and furthermore the reliability information whose total number is larger than this repetition number by one is sequentially added, or subtracted form each other in order to detect the overflow number. In the Viterbi decoder 27, while the second soft-decision data D29, D30, D31, or D32 corresponding to each of the reception processing speeds is Viterbi-decoded, the most likelihood pathmetric value is detected, and further the polarity information corresponding to the second soft-decision data D29, D30, D31, or D32 is sequentially compared with the polarity information corresponding to the coded data D67 which is produced by convolution-coding the respective decoded data D35 to D38 corresponding thereto so as to detect the prediction error number. In the data speed predicting device 28, the transmission processing speed used in the transmission processing of the reception data D7 is predicted based upon the most likelihood pathmetric value, the prediction error number, the polarity incoincident number, and the overflow number, which are acquired with respect to each of the reception processing speeds. As a consequence, even when a relatively large number of errors happen to occur in the decoded data D35 to D38, so that the four sorts of most likelihood pathmetric values become the substantially same values, or the four sorts of polarity incoincident numbers becomes substantially same values, since both the polarity incoincident number and the overflow number are used which can be acquired without having the adverse influences caused by the occurrences of the errors in these decoded data D35 to D38, the transmission processing speed used in the transmission processing of the reception data D7 can be predicted by greatly reducing the errors. Therefore, the prediction precision of the transfer speed can be improved.

It should be understood that the above-explained embodiment has described such a case that the wireless transfer speed is selected to be 19,200 bps, and the transmission processing speeds are selected from the four sorts of transmission processing speeds, i.e., 9,600 bps, 4,800 bps, 2,400 bps, and 1,200 bps. However, the present invention is not limited thereto, but may be modified. That is, other various sorts of wireless transfer speeds and also of transmission processing speeds may be alternatively used if the transmission processing may be carried out in such a manner that the bit length of the data to be transmitted apparently becomes a predetermined bit length.

Also in the above-described embodiment, the 16-value soft-decision data is used in the reception processing. The present inventions not limited to this embodiment. That is, various sorts of multi-value soft-decision data such as eight-value soft-decision data may be employed, resulting in a similar effect.

Further, the above-explained embodiment has described such a case that the transmission processing speed actually used in the transmission processing is predicted by using the most likelihood pathmetric value, the prediction error number, the polarity incoincident number, the overflow number, and also the error detection result. The present invention is not limited to the above-described embodiment, but may be modified. For instance, while the transmission power is not controlled when the data is transmitted, the level of the reception data D7 is controlled by way of an AGC (Automatic Gain Control). Thus, when the soft-decision levels are substantially equal to each other irrespective of the reception processing speed, the transmission processing speed may be alternatively predicted by using the most likelihood pathmetric value, the prediction error number, the polarity incoincident number, and the error detection result, but not using the overflow number. In this alternative case, it is possible to achieve a similar effect to the above-explained embodiment.

Further, the above-explained embodiment has described such a case that the transmission processing speeds at the step SP22 and the step SP30 of the transmission processing speed predicting processing operation RT1 are predicted by using the most likelihood pathmetric correction value, the prediction error correction number, the polarity incoincident number, and also the overflow number, respectively. The present invention is not limited to this embodiment, but may be modified. For example, a detection is made of shift amounts between the most likelihood pathmetric value, the prediction error number, the polarity incoincident number, the overflow number, and the first to fourth reference values corresponding thereto. Then, the most likelihood pathmetric correction value, the prediction error correction number, the polarity incoincident number, and the overflow number, corresponding thereto, may be weighted based on the respective shift amounts to be used to predict the transmission processing speeds.

Further, the above-explained embodiment has described such a case that in the transmission processing speed predicting process operation RT1, the most likelihood pathmetric value, the prediction error number, the polarity incoincident number, and the overflow number are compared with the first to fourth reference values corresponding thereto by employing these first to fourth reference values preset to the arbitrary values. The present invention is not limited thereto, but may be modified. Alternatively, these first to fourth reference values may be weighted respectively by using any other methods so as to predict the transmission processing speed.

Further, the above-explained embodiment has described such a case that the present invention has been applied to the transmission processing speed predicting method used in the communication terminal 1, and also applied to this communication terminal 1. The present invention is not limited thereto, but may be modified. For instance, the present invention may be alternatively applied to other sorts of receiver apparatuses and transmission speed predicting methods employed in these receiver apparatuses capable of receiving data which is transmission-processed in a preselected transmission processing speed among a plurality of transmission processing speeds, and then is transmitted without adding information about this used transmission processing speed.

Moreover, in the above-explained embodiment, the reception processing is carried out by using the reception processing speed in such a manner that the reception processing speeds are successively lowered from 9,600 bps when this reception processing is performed in the communication terminal 1. Alternatively, the reception processing may be commenced from any of these reception processing speeds.

In addition, the above-explained embodiment has described that both the receiver 12 and the deinterleaver 25 are applied as the receiving means for producing the first data D28 having a predetermined format from the received data D7, and also for repeatedly transmitting the first data D28 by sequentially using the plural sorts of transfer speeds one by one. The resent invention is not limited thereto, but may be modified. For example, other types of receiving means may be alternatively applied if the alternative receiving means are capable of producing the first data D28 having a predetermined format from the received data D7, and also of repeatedly transmitting the first data D28 by sequentially using the plural sorts of transfer speeds one by one.

Moreover, the above-described embodiment has described such a case that the data adding processor 26 is applied as the first incoincident number detecting means for sequentially comparing polarity information of the first data D28 with each other, whose repetition number is larger than the repetition number of the first data D28 by one so as to detect a first incoincident number of the polarity information, and also for sequentially selecting one of the polarity information about certainties from the polarity information of the repetition number larger than the repetition number by one to produce second data D29, D30, D31, or D32 constructed of a plurality of the selected polarity information. The present invention is not limited thereto, but may be modified. For example, any other types of first incoincident number detecting means may be applied if these alternative first incoincident number detecting means may alternatively detect the first incoincident number of the polarity information by using the polarity information whose total number is larger than the repetition number of the first data D28 by one every transfer speed, and also may produce the second data D29, D30, D31, or D32.

Moreover, the above-described embodiment has described such a case that the Viterbi decoder 27 is applied as the most likelihood value detecting means for Viterbi-decoding the second data D29, D30, D31, or D32 with respect to each of the plural sorts of transfer speeds so as to produce the decoded data D35, D36, D37, or D38, and also for detecting the most likelihood pathmetric value by this Viterbi-decoding operation. The present invention is not limited thereto, but may be modified. For instance, any other types of most likelihood detecting means may be applied if these alternative most likelihood detecting means may alternatively produce the decoded data D35, D36, D37, or D38 by Viterbi-decoding the second data D29, D30, D31, or D32 every transfer speed, and also may detect the most likelihood pathmetric values by this Viterbi-decoding operation.

Moreover, the above-described embodiment has described such a case that the data error number predicting circuit 39 is applied as the second incoincident number detecting means for sequentially comparing the second data D29, D30, D31 or D32 with coded data D35, D36, D37, or D38 obtained by convolution-coding the decoded data D35, D36, D37, or D38 corresponding to the second data with respect to each of the plural transfer speeds to thereby detect the second incoincident number of the polarity information. The present invention is not limited thereto, but may be modified. For example, any other types of second incoincident number detecting means may be alternatively applied if these alternative second incoincident number detecting means may sequentially comparing the second data D29, D30, D31 or D32 with coded data D35, D36, D37, or D38 obtained by convolution-coding the decoded data D35, D36, D37, or D38 corresponding to the second data with respect to each of the plural transfer speeds to thereby detect the second incoincident number of the polarity information.

Moreover, the above-described embodiment has described such a case that the data speed predicting device 28 is applied as the transfer speed detecting means for predicting the transfer speed of the transmission processing for the receiver data D7 based upon the first incoincident number, the most likelihood pathmetric value, and the second incoincident number, which are detected with respect to each of the transfer speeds. The present invention is not limited thereto, but my be modified. For instance, any other types of transfer speed predicting means may be alternatively applied if the alternative transfer speed predicting means may alternatively predict the transfer speed of the transmission processing for the received data D7 based upon the first incoincident number, the most likelihood pathmetric value, and the second incoincident number, which are detected with respect to each of the transfer speeds.

As previously described in detail, in accordance with the present invention, the transfer speed predicting apparatus is comprised of: receiving means for producing first data having a predetermined format from the received data and for sequentially using the respective sorts of transfer speeds one by one to repeatedly send out the first data; first incoincident number detecting means for sequentially comparing polarity information of the first data with each other, whose repetition number is larger than the repetition number of the first data by one so as to detect a first incoincident number of the polarity information based upon the repetition number corresponding there to for every transmission speed, and also for sequentially selecting one of the polarity information about certainties from the polarity information of the repetition number larger than the repetition number by one to produce second data constructed of a plurality of the selected polarity information; most likelihood value detecting means for Viterbi-decoding the second data with respect to each of the plural sorts of transfer speeds so as to produce decoded data, and also for detecting a most likelihood pathmetric value by the Viterbi-decoding operation; second incoincident number detecting means for sequentially comparing the second data with coded data obtained by convolution-coding the decoded data corresponding to the second data with respect to each of the plural transfer speeds to thereby detect a second incoincident number of the polarity information; and transfer speed detecting means for predicting the transfer speed of the transmission processing for the received data based upon the first incoincident number, the most likelihood pathmetric value, and the second incoincident number, which are detected with respect to each of the transfer speeds. As a consequence, even when a relatively large number of errors happen to occur in the decoded data, so that the respective most likelihood pathmetric values acquired every transfer speed are made substantially equal to each other, or the second incoincident numbers acquired every transfer speed become substantially same values, the transfer speed of the transmission processing for such data can be predicted by greatly reducing the errors in addition to the most likelihood pathmetric values and the second incoincident number. This data is received by using the first incoincident number detectable without being adversely influenced by the occurrence condition of the error in this decoded data in the prediction of the transfer speed. Therefore, it is possible to realize the transfer speed predicting apparatus capable of increasing the prediction precision of the transfer speed.

Also, a transfer speed predicting method, according to the present invention, is featured by: producing first data having a predetermined format from the received data and for sequentially using the respective sorts of transfer speeds one by one to repeatedly send out the first data; a first incoincident number detecting step for sequentially comparing polarity information of the first data with each other based upon the repetition number corresponding thereto for every transmission speed, whose repetition number is larger than the repetition number of the first data by one so as to detect a first incoincident number of the polarity information, and also for sequentially selecting one of the polarity information about certainties from the polarity information of the repetition number larger than the repetition number by one to produce second data constructed of a plurality of the selected polarity information; a most likelihood value detecting step for Viterbi-decoding the second data with respect to each of the plural sorts of transfer speeds so as to produce decoded data, and also for detecting a most likelihood pathmetric value by the Viterbi-decoding operation; a second incoincident number detecting step for sequentially comparing the second data with coded data obtained by convolution-coding the decoded data corresponding to the second data with respect to each of the plural transfer speeds to thereby detect a second incoincident number of the polarity information; and predicting the transfer speed of the transmission processing for the received data based upon the first incoincident number, the most likelihood pathmetric value, and the second incoincident number, which are detected with respect to each of the transfer speeds. As a consequence, even when a relatively large number of errors happen to occur in the decoded data, so that the respective most likelihood pathmetric values acquired every transfer speed are made substantially equal to each other, or the second incoincident numbers acquired every transfer speed become substantially same values, the transfer speed of the transmission processing for such data can be predicted by greatly reducing the errors. This data is received by using the first incoincident number detectable without being adversely influenced by the occurrence condition of the error in this decoded data in the prediction of the transfer speed. Therefore, it is possible to realize the transfer speed predicting method capable of increasing the prediction precision of the transfer speed.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmission speed predicting apparatus for selecting one transmission processing speed of digital data from a plurality of transmission processing speeds having a relation of a predetermined ratio, for convolution-coding the digital data, and producing repeated data by repeating each bit data of the convolution-coded data a number of times based on a ratio of the selected transmission processing speed to a maximum transmission processing speed among the plurality of transmission processing speeds, and for predicting a transmission processing speed of transmission data from received data obtained by receiving the transmission data including the digital data and the repeated data, said transmission speed predicting apparatus comprising:

receiving means for producing first decision data including polarity data of each bit of the received data by processing the received data;

storing means for storing the first decision data supplied from said receiving means;

first incoincident number detecting means for reading the first decision data from said storing means at each of the plurality of transmission processing speeds and comparing polarity data corresponding to each bit data of the digital data in the received data with polarity data corresponding to the repeated data based on each bit data and detecting a first incoincident number using a result of the comparison, and for selecting a most likely polarity data from the polarity data corresponding to each bit data of the digital data and the polarity data corresponding to the repeated data and producing second decision data using the selected most likely polarity data;

most likelihood value detecting means for Viterbi-decoding the second decision data for each of the plurality of transmission processing speeds so as to produce decoded data, and for detecting a most likelihood pathmetric value;

second incoincident number detecting means, including convolution-coding means for producing convolution-coded data by convolution-coding the decoded data, for comparing corresponding polarity data of the coded data supplied by said convolution-coding means with polarity data of the second decision data for each of the plurality of transmission processing speeds, and detecting a second incoincident number using a result of the comparison; and transfer speed selecting means for selecting the transmission processing speed of the transmission data corresponding to the received data based upon the first incoincident number, the most likelihood pathmetric value, and the second incoincident number.

2. The transmission speed predicting apparatus according to claim 1 wherein:

the first and second decision data are respectively first and second soft-decision data each including corresponding reliability data indicating a reliability of the corresponding polarity data in addition to the corresponding polarity data;

said first incoincident number detecting means compares the polarity data corresponding to each bit data of the digital data in the received data and the polarity data corresponding to the repeated data based on each bit data, adds the reliability data corresponding to the respective compared polarity data to each other when the respective polarity data are coincident with each other, subtracts the reliability data from each other when the respective polarity data are incoincident with each other, and detects a number of times that the addition or subtraction of the reliability data produces overflow from a specified value; and said transmission processing speed selecting means selects the transmission processing speed of the transmission data corresponding to the received data, based on the first incoincident number, the most likelihood pathmetric value, the second incoincident number, and the detected number of times of overflow.

3. The transmission speed predicting apparatus according to claim 2 wherein said first incoincident number detecting means produces one new reliability data by adding/subtracting the reliability data corresponding to the respective compared polarity data in accordance with a result of the comparison of the polarity data of the first soft-decision data, and produces the second soft-decision data by adding the produced new reliability data to the most likely polarity data.

4. The transmission speed predicting apparatus according to claim 1 wherein:

an error detection signal is added to the digital data in the transmission data processed with a predetermined transmission processing speed among the plurality of transmission processing speeds;

an error in the decoded data, which is predicted using the error detection signal included in the decoded data, is detected for each of the plurality of transmission processing speeds; and said transfer speed selecting means selects the transmission processing speed of the transmission data corresponding to the received data, based on the first incoincident number, the most likelihood pathmetric value, the second incoincident number, and the detected error in the decoded data.

5. A transmission speed predicting method for selecting one transmission processing speed of digital data from a plurality of transmission processing speeds having a relation of a predetermined ratio, for convolution-coding the digital data, and producing repeated data by repeating each bit data of the convolution-coded data a number of times based on a ratio of the selected transmission processing speed to a maximum transmission processing speed among the plurality of transmission processing speeds, and for predicting a transmission processing speed of transmission data from received data obtained by receiving the transmission data including the digital data and the repeated data, said transmission speed predicting method comprising the steps of:

producing first decision data including polarity data of each bit of the received data by processing the received data;

storing the first decision data;

reading the first decision data which has been stored at each of the plurality of transmission processing speeds and comparing polarity data corresponding to each bit data of the digital data in the received data with polarity data corresponding to the repeated data based on each bit data and detecting a first incoincident number using a result of the comparison, and selecting a most likely polarity data from the polarity data corresponding to each bit data of the digital data and the polarity data corresponding to the repeated data and producing second decision data using the selected most likely polarity data;

Viterbi-decoding the second decision data for each of the plurality of transmission processing speeds to produce decoded data, and detecting a most likelihood pathmetric value;

comparing polarity data of coded data obtained by convolution-coding the corresponding decoded data with polarity data of the second decision data for each of the plurality of transmission processing speeds and detecting a second incoincident number using a result of the comparison; and selecting the transmission processing speed of the transmission data corresponding to the received data based upon the first incoincident number, the most likelihood pathmetric value, and the second incoincident number.

6. The transmission speed predicting method according to claim 5 wherein:

the first and second decision data are respectively first and second soft-decision data each including reliability data indicating a reliability of the polarity data of the corresponding decision data in addition to the polarity data;

in the step of detecting the first incoincident number, the polarity data corresponding to each bit data of the digital data in the received data is compared with the polarity data corresponding to the repeated data based on each bit data, the reliability data corresponding to the respective compared polarity data are added to each other when the respective polarity data are coincident with each other, and the reliability data are subtracted from each other when the respective polarity data are incoincident with each other, and a number of times that the addition or subtraction of the reliability data produces overflow from a specified value is determined; and the transmission processing speed of the transmission data corresponding to the received data is selected, based on the first incoincident number, the most likelihood pathmetric value, the second incoincident number, and the number of times of overflow.

7. The transmission speed predicting method according to claim 6 wherein in the step of detecting the first incoincident number, one new reliability data is produced by adding/subtracting the reliability data corresponding to the respective compared polarity data in accordance with a result of the comparison of the polarity data of the first soft-decision data, and the second soft-decision data is produced by adding the produced new reliability data to the most likely polarity data.

8. The transmission speed predicting method according to claim 5 wherein:

an error detection signal is added to the digital data in the transmission data processed with a predetermined transmission processing speed among the plurality of transmission processing speeds;

an error in the decoded data, which is predicted using the error detection signal included in the decoded data, is detected for each of the plurality of transmission processing speeds; and the transmission processing speed of the transmission data corresponding to the received data is selected, based on the first incoincident number, the most likelihood pathmetric value, the second incoincident number, and the detected error in the decoded data.

\* \* \* \* \*